United States Patent
Mishima et al.

(10) Patent No.: US 12,034,892 B2
(45) Date of Patent: Jul. 9, 2024

(54) DISPLAY CONTROL DEVICE, INFORMATION APPARATUS, AND NON-TRANSITORY RECORDING MEDIUM STORING DISPLAY CONTROL PROGRAM CAUSING A DISPLAY UNIT TO DISPLAY A SELECTED HIGHER LAYER SETTING ITEM, DISPLAY A SELECTED NEXT LAYER SETTING ITEM BELOW THE SELECTED HIGHER LAYER SETTING ITEM, AND NOT DISPLAY UN-SELECTED SETTING ITEMS

(71) Applicant: FUJIFILM CORPORATION, Tokyo (JP)

(72) Inventors: Yu Mishima, Kanagawa (JP); Yoshihiro Sekine, Kanagawa (JP); Yuki Shimizu, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/844,777

(22) Filed: Jun. 21, 2022

(65) Prior Publication Data
US 2022/0321715 A1    Oct. 6, 2022

Related U.S. Application Data

(63) Continuation of application No. PCT/JP2020/049161, filed on Dec. 28, 2020.

(30) Foreign Application Priority Data

Dec. 26, 2019  (JP) .................................. 2019-236892

(51) Int. Cl.
*H04N 1/00*    (2006.01)
*G06F 3/0482*   (2013.01)

(52) U.S. Cl.
CPC ..... *H04N 1/00427* (2013.01); *H04N 1/00411* (2013.01); *G06F 3/0482* (2013.01);
(Continued)

(58) Field of Classification Search
None
See application file for complete search history.

(56) References Cited

U.S. PATENT DOCUMENTS 9,544,453 B2 *  1/2017  Umezawa .......... H04N 1/00413
2013/0321836 A1  12/2013  Seto
(Continued)

FOREIGN PATENT DOCUMENTS

JP    2014-6845 A    1/2014
JP    2014-006875 A  1/2014
(Continued)

OTHER PUBLICATIONS

Extended European Search Report dated Dec. 19, 2022, issued in corresponding EP Patent Application No. 20907901.1.
(Continued)

*Primary Examiner* — Haris Sabah
(74) *Attorney, Agent, or Firm* — SOLARIS Intellectual Property Group, PLLC

(57) ABSTRACT

A display control device includes a processor and a memory coupled to or integrated with the processor and controls display of an operation screen of an information apparatus, in a case in which a selected setting item is arbitrarily selected from plural setting items displayed in a list form in the operation screen, the processor hides a setting item other than the selected setting item, displays the selected setting item on an upper side of a display region in which the plural setting items were displayed in a list form, and additionally displays a relevant setting item related to the selected setting item below the selected setting item.

9 Claims, 16 Drawing Sheets

(52) U.S. Cl.
CPC ..... *H04N 1/00408* (2013.01); *H04N 1/00424* (2013.01); *H04N 1/00435* (2013.01); *H04N 1/00458* (2013.01); *H04N 2201/0094* (2013.01)

(56) References Cited

U.S. PATENT DOCUMENTS

| | | | |
|---|---|---|---|
| 2015/0146226 A1* | 5/2015 | Ichiyama | H04N 1/00506 358/1.13 |
| 2016/0094737 A1* | 3/2016 | Sugiura | H04N 1/00501 358/1.15 |
| 2016/0142566 A1 | 5/2016 | Nakajima et al. | |
| 2017/0031587 A1 | 2/2017 | Kimoto et al. | |
| 2018/0103160 A1* | 4/2018 | Sugita | H04N 1/00925 |
| 2019/0132460 A1* | 5/2019 | Sawano | H04N 1/00424 |
| 2019/0060891 A1 | 8/2019 | Naoki | |
| 2021/0306490 A1* | 9/2021 | Mizuno | H04N 1/4433 |

FOREIGN PATENT DOCUMENTS

| | | |
|---|---|---|
| JP | 2016-99655 A | 5/2016 |
| JP | 2016-101659 A | 6/2016 |
| JP | 2017-33065 A | 2/2017 |
| JP | 2019-144934 A | 8/2019 |

OTHER PUBLICATIONS

English language translation of the following: Office action dated Apr. 4, 2023 from the JPO in a Japanese patent application No. 2021-567764 corresponding to the instant patent application. This office action translation is submitted now in order to supplement the understanding of the cited references which are being disclosed in the instant Information Disclosure Statement.

\* cited by examiner

DISPLAY CONTROL DEVICE, INFORMATION APPARATUS, AND NON-TRANSITORY RECORDING MEDIUM STORING DISPLAY CONTROL PROGRAM CAUSING A DISPLAY UNIT TO DISPLAY A SELECTED HIGHER LAYER SETTING ITEM, DISPLAY A SELECTED NEXT LAYER SETTING ITEM BELOW THE SELECTED HIGHER LAYER SETTING ITEM, AND NOT DISPLAY UN-SELECTED SETTING ITEMS

CROSS-REFERENCE TO RELATED APPLICATIONS

This application is a continuation application of International Application No. PCT/JP2020/049161, filed on Dec. 28, 2020, the disclosure of which is incorporated herein by reference in its entirety. Further, this application claims priority from Japanese Patent Application No. 2019-236892, filed on Dec. 26, 2019, the disclosure of which is incorporated herein by reference in its entirety.

FIELD

The technology of the present disclosure relates to a display control device, an information apparatus, and a non-transitory recording medium storing a display control program.

As an information apparatus, a so-called multi-function peripheral that executes a plurality of functions such as a copy function, a scanning function, a facsimile function, and a printing function is known. A technology in which setting items for setting various functions of an information communication apparatus having a communication function among such multi-function peripherals are displayed in an operation screen in a selectable manner, and an operator is caused to select a desired setting item so that various functions of the information communication apparatus can be set is known. In addition, a technology in which, since there are a wide variety of functions that can be set, items for setting the functions are displayed in a hierarchical manner and are sequentially operated so that various functions can be set, such as additionally displaying relevant setting items related to an arbitrary setting item once the setting item is selected from the setting items displayed in the operation screen, is known.

Examples of a method of additionally displaying a relevant setting item related to an arbitrary setting item once the setting item is selected from the setting items displayed in the operation screen include a method (1) in which, once the operator selects an arbitrary setting item, a relevant setting item is displayed as transition from an operation screen in which the selected setting item is displayed to an operation screen in which the relevant setting item is displayed is made (that is, a switching display method). In addition, for example, there is a method (2) in which, once the operator selects an arbitrary setting item, a relevant setting item is popped up at an arbitrary position on a previous operation screen in which the selected setting item is displayed (that is, a pop-up display method). In addition, for example, there is a method (3) in which, once the operator selects an arbitrary setting item, a relevant setting item is displayed immediately below the selected setting item displayed in a previous operation screen in an interruptive manner (that is, an interrupt display method). For example, Japanese Patent Application Laid-Open (JP-A) No. 2014-6875 describes an invention as an example of the method (2), and Japanese Patent Application Laid-Open (JP-A) No. 2017-33065 describes an invention as an example of the method (3).

SUMMARY

However, the above-described methods have the following problems.

In the case of the switching display method (1), once a setting item displayed in an operation screen of a higher layer (for example, a layer in which a selected setting item is display) is selected, switching from the operation screen to an operation screen of a relevant setting item is made. Therefore, it is difficult to understand which layer the currently displayed operation screen is in.

In the case of the pop-up display method (2), once a setting item displayed in an operation screen of a higher layer is selected, an operation screen of a relevant setting item is displayed in a superimposed manner on the operation screen of the higher layer, whereby it is possible to understand which layer the popped-up relevant setting item is in. However, it is difficult to understand which setting item in the higher layer the relevant setting item is specifically related to. In addition, since the number of display elements in one operation screen increases, there is also a problem that the operator is confused with the operation.

In the case of the interrupt display method (3), since a relevant setting item is displayed immediately below a selected setting item displayed in an operation screen of a higher layer in an interruptive manner, it is easy to understand which setting item in the higher layer the displayed relevant setting item is related to. However, in a case where the number of setting items displayed in the same layer as that of the selected setting item is large, when the relevant setting item is displayed in an interruptive manner, a setting item displayed below may protrude from the operation screen and be cut off halfway. In a case where the selected setting item is displayed in a lower region of the operation screen, a display space immediately below the selected setting item is narrow, and not all the relevant setting items can be displayed within the operation screen. For example, in a case where a setting item $I_2$ is selected from four setting items $I_1$, $I_2$, $I_3$, and $I_4$ displayed in a list form in an operation screen 321A as illustrated in FIG. 21, relevant setting items $I_{21}$ and $I_{22}$ are displayed in an interruptive manner, as a result of which the setting item $I_4$ displayed on the lower side protrudes from the operation screen and is cut off halfway. In a case where a selected setting item $I_4$ is displayed in a lower region of an operation screen 321B as illustrated in FIG. 22, a relevant setting item $I_{42}$ protrudes from the operation screen 321B and is cut off halfway. Therefore, it is necessary to perform an additional operation such as a scroll operation to display setting items in order to visually recognize all the setting items in a higher layer and relevant setting items displayed in an interruptive manner, and there is a problem in operability. In addition, since the number of display elements in one operation screen increases, there is also a problem that the operator is confused with the operation.

An object of the technology of the disclosure is to provide a display control device, an information apparatus, and a non-transitory recording medium storing a display control program capable of setting various functions by using an operation screen excellent in visibility and operability by efficiently displaying items for setting the functions in the operation screen.

Solution to Problem

A display control device according to a first aspect is a display control device that includes a processor and a memory coupled to or integrated with the processor and controls display of an operation screen of an information apparatus, in a case in which a selected setting item is arbitrarily selected from a plurality of setting items displayed in a list form in the operation screen, the processor hides setting items other than the selected setting item, displays the selected setting item on an upper side of a display region in which the plurality of setting items were displayed in a list form, and additionally displays a relevant setting item related to the selected setting item below the selected setting item.

In the display control device, in a case in which the selected setting item is reselected in a state in which the setting items other than the selected setting item are hidden, the hidden setting items may be redisplayed.

In the display control device, in a case in which the hidden setting items are redisplayed, the redisplayed setting items and the selected setting item may be displayed so as to be distinguishable from each other.

In the display control device, the setting item and the relevant setting item may be configured in a hierarchical manner, the setting item and the hidden setting items other than the selected setting item may be setting items in a same layer, and the relevant setting item related to the selected setting item may be a setting item in a lower layer than that of the selected setting item.

In the display control device, the operation screen may be an operation screen of an information apparatus having, as main functions, at least two of a copy function of copying a document, a scanning function of reading a document, or a facsimile function of transmitting an image obtained by reading a document as image data, and the plurality of setting items are setting items for setting processing conditions of the main functions.

An information apparatus according to a second aspect includes the display control device according to the first aspect.

A non-transitory recording medium storing a display control program executable by a processor according to a third aspect executes processing of: in a case in which an arbitrary setting item is selected from a plurality of setting items displayed in a list form in an operation screen, hiding setting items other than the selected setting item, displaying the selected setting item on an upper side of a display region in which the plurality of setting items were displayed in a list form, and additionally displaying a relevant setting item related to the selected setting item below the selected setting item.

In the non-transitory recording medium storing a display control program, in a case in which the selected setting item is reselected in a state in which the setting item other than the selected setting item is hidden, processing of displaying the hidden setting item again may be executed.

Advantageous Effects of the Disclosure

According to the technology of the disclosure, it is possible to set various functions by using an operation screen excellent in visibility and operability by efficiently displaying items for setting the functions in the operation screen.

DESCRIPTION OF EMBODIMENTS

Hereinafter, embodiments of the present disclosure will be described with reference to the drawings.

First Embodiment (Multi-Function Peripheral 100)

Figure 1:
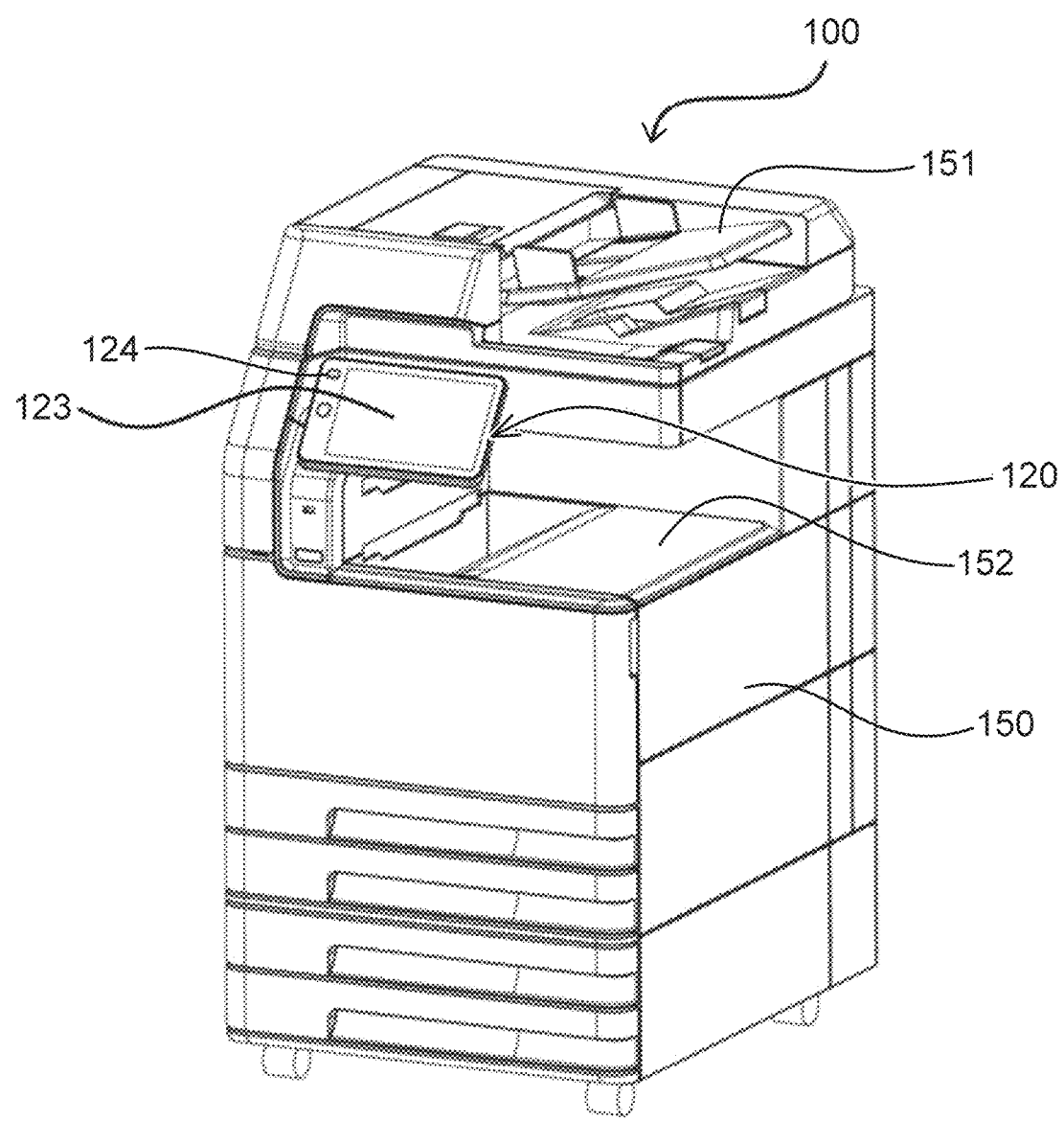
FIG. 1 is a view illustrating an appearance of a multi-function peripheral according to a first embodiment.
Figure 2:
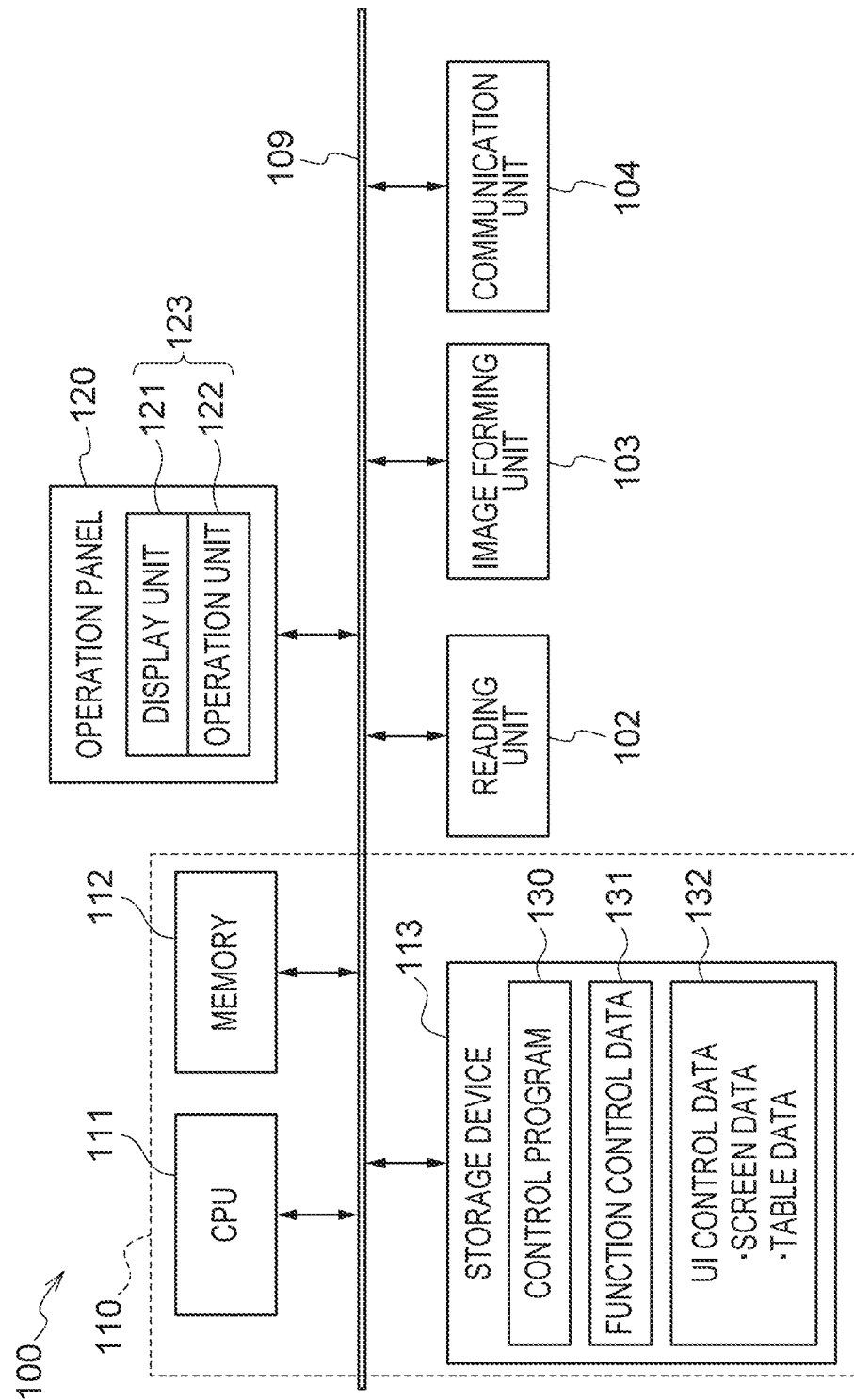
FIG. 2 is a block diagram illustrating a hardware configuration of a display control device used in the multi-function peripheral according to the first embodiment.

An information apparatus of the disclosure will be described with a multi-function peripheral 100 as an example. FIG. 1 is a view illustrating an appearance of the multi-function peripheral 100 according to the present embodiment. FIG. 2 is a block diagram illustrating a hardware configuration of the multi-function peripheral 100.

The multi-function peripheral 100 illustrated in FIGS. 1 and 2 is a device capable of executing processing for functions such as copying, printing, image scanning, and facsimile (also referred to as FAX). As illustrated in FIG. 2, the multi-function peripheral 100 includes a control device 110, a reading unit 102, an image forming unit 103, and a communication unit 104 in a main body 150. Note that the multi-function peripheral 100 is an example of the information apparatus. The multi-function peripheral 100 can perform data communication with an information processing apparatus such as a personal computer or a server in an office connected to a local area network (LAN) line or the like, or perform facsimile communication with a communication apparatus in another office through a public line such as a telephone line. Therefore, the multi-function peripheral 100 is also an example of the information communication apparatus. That is, the information communication apparatus has a function of transmitting a voice or an image by communication. The information apparatus of the disclosure includes, in addition to a telephone line apparatus such as a mobile phone and a facsimile, for example, an information apparatus in which functions of office equipment such as a copier, a printer, an image scanner, and a facsimile are housed in one housing, like the multi-function peripheral 100.

An operation panel 120, the control device 110 including a storage device 113, the reading unit 102, the image forming unit 103, and the communication unit 104 are mutually connected by a bus 109. Each unit of the multi-function peripheral 100 will be described below.

(Reading Unit 102, Image Forming Unit 103, and Communication Unit 104)

The reading unit 102 reads an image of a document. Specifically, the reading unit 102 generates image data by optically reading an image of a document and converting the image into a digital signal.

The image forming unit 103 forms an image on a medium such as a paper sheet. Specifically, the image forming unit 103 forms an image on a medium by, for example, an electrophotographic method in which an image is formed by electrostatically attaching a toner onto a paper sheet. Note that the image forming unit 103 may form an image on a medium by another method such as an inkjet method in which an image is formed by ejecting an ink onto a paper sheet.

The communication unit 104 communicates with an external device such as another facsimile device. Specifically, the communication unit 104 transmits and receives various pieces of data to and from an external device by communication using various wired or wireless communication lines. Examples of the communication line include the Internet, an intranet, and a public telephone line.

For example, the multi-function peripheral 100 includes a document feeding device 151 provided at an upper portion of the main body 150 as illustrated in FIG. 1. The document feeding device 151 feeds a document to a document reading stage (not illustrated) disposed on an upper surface of the main body 150. The reading unit 102 is disposed at a position facing the reading stage in the main body 150. The document feeding device 151 can be lifted up. As the document feeding device 151 is lifted up, the reading stage is exposed and can be used as a so-called flatbed type. Therefore, a user can directly set a document on the reading stage without using the document feeding device 151.

The multi-function peripheral 100 of this example has, as four main functions, a copy function of copying a document, a scanning function of reading a document, a facsimile function of transmitting an image obtained by reading a document as image data, and a printing function of printing an image on a paper sheet. In a case where processing related to the scanning function is executed in the multi-function peripheral 100, an image of a document is read by the reading unit 102, and image data is generated. In a case where processing related to the copy function is executed in the multi-function peripheral 100, the image forming unit 103 prints an image of a document on another paper sheet based on image data generated by the reading unit 102. The paper sheet on which an image is printed is discharged to a paper sheet discharging unit 152 provided in the main body 150. In a case where processing related to the facsimile function is executed in the multi-function peripheral 100, image data generated by the reading unit 102 is output to the communication unit 104 and transmitted to a destination via the communication unit 104. In a case where processing related to the printing function is executed in the multi-function peripheral 100, the image forming unit 103 prints an image on a paper sheet based on image data input from a personal computer or the like. The paper sheet on which an image is printed is discharged to the paper sheet discharging unit 152.

In addition, a feeding unit in which a paper sheet is loaded, a paper sheet transport mechanism that transports a paper sheet to the image forming unit 103 and the paper sheet discharging unit 152, and the like are provided inside the main body 150.

(Operation Panel 120)

The multi-function peripheral 100 includes the operation panel 120 for a user to operate the multi-function peripheral 100. The operation panel 120 is an example of a user interface. The user interface is a device for exchanging information between the multi-function peripheral 100 and a user, specifically, for inputting an operation instruction from a user to the multi-function peripheral 100 or displaying information such as a status of the multi-function peripheral 100 to a user.

Figure 3:
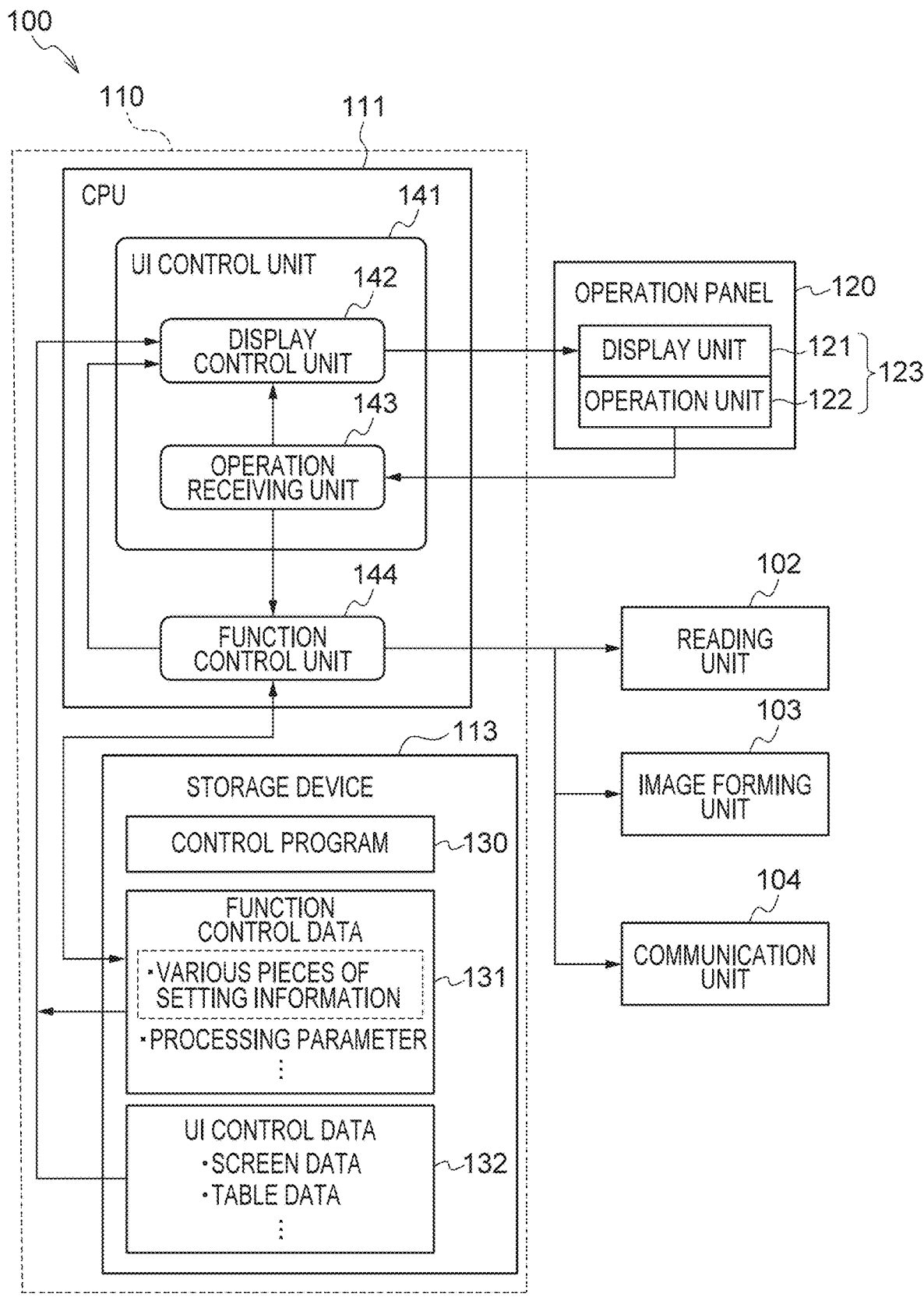
FIG. 3 is a block diagram illustrating a functional configuration of the display control device used in the multi-function peripheral according to the first embodiment.

In the present embodiment, specifically, the operation panel 120 includes a display unit 121 and an operation unit 122 as illustrated in FIGS. 2 and 3.

The display unit 121 displays an operation screen, various messages such as operation guidance, and the like. The operation unit 122 is a component on which a user performs an input operation. The display unit 121 is implemented by, for example, a liquid crystal display, an organic electro luminescence (EL) display, or the like. The operation unit 122 and the display unit 121 are implemented by a touch panel display 123 in which both the operation unit 122 and the display unit 121 are integrated. The operation unit 122 is a resistive type touch panel, a capacitive type touch panel, or the like, and detects a touch operation of a user. A region where an operation screen of the display unit 121 is displayed and a region where a touch operation of the operation unit 122 can be detected overlap with each other in the touch panel display 123. As a result, once a user performs a touch operation on an operation screen displayed on the display unit 121, the operation unit 122 detects the touch operation performed on the operation screen and a position at which the touch operation is performed on the operation screen, and outputs a detection signal to the control device 110.

Examples of the touch operation of the user include operations such as tapping, flicking, sliding, and dragging. The tapping operation is an operation of touching the screen of the display unit 121 with a finger. The flicking operation is an operation of touching the screen of the display unit 121 in such a way as to flick the screen with a finger. The sliding operation is an operation of moving a finger in a state of touching the screen of the display unit 121 with the finger. The dragging operation is an operation for moving an image such as an icon displayed on the display unit 121. The dragging operation is an operation of touching an image displayed on the display unit 121 with a finger, then moving the finger touching the image, and then releasing the finger from the image. The operation unit 122 that is a touch panel outputs, as a detection signal, a movement locus of a finger associated with these touch operations in an operation screen. Note that the touch operation may be not only an operation using a finger of a user but also an operation using a tool such as a touch pen. An operator can operate the multi-function peripheral 100 via an operation image (graphical user interface (GUI)) displayed on the operation panel 120. Furthermore, the multi-function peripheral 100 can be operated via an operation screen displayed on a display included in an external apparatus (not illustrated) in which an operation application for the multi-function peripheral 100 is installed.

The operation panel 120 further includes an operation key 124 disposed outside the screen of the display unit 121 as illustrated in FIG. 1. Examples of the operation key 124 include a power key for supplying power to the multi-function peripheral 100, a cancel key for canceling various executions, and the like. As described above, the operation panel 120 according to the present embodiment includes a mechanical operation unit in addition to the touch panel display 123 including the operation unit 122.

Figure 4:
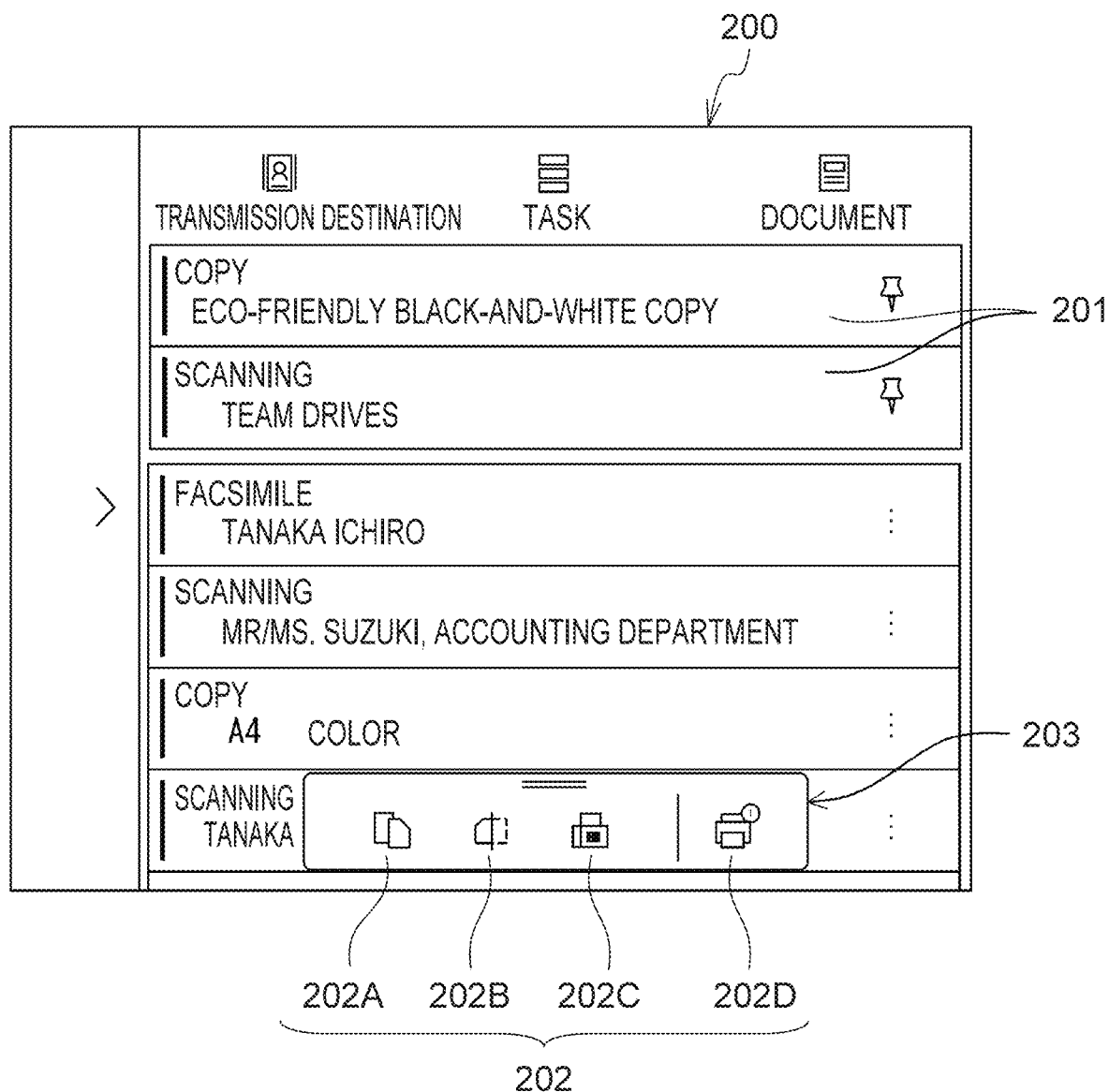
FIG. 4 is a view illustrating a top screen in an operation screen of the multi-function peripheral according to the first embodiment.

The display unit 121 can display, for example, various operation screens such as a task item selection screen 200 illustrated in FIG. 4. The "operation screen" of the disclosure only needs to be a screen used for operating the multi-function peripheral 100, and is a concept including not only an operation screen for operation provided in the multi-function peripheral 100 itself but also a screen provided in an apparatus for remotely operating the multi-function peripheral 100.

(Control Device 110)

The control device 110 is a device that controls each unit of the multi-function peripheral 100 including the operation panel 120. Specifically, the control device 110 includes a central processing unit (CPU) 111, a memory 112, and a storage device 113 as illustrated in FIG. 2. The control device 110 controls the multi-function peripheral 100 based on information stored in the storage device 113.

The storage device 113 stores various programs including a control program 130 and various pieces of data including function control data 131 and user interface (UI) control data 132. The control program 130 is a program that causes a computer including the CPU 111 to function as the control device 110. The function control data 131 is data used to control the reading unit 102, the image forming unit 103, and the communication unit 104, and includes various pieces of setting information, processing parameters, and the like. The processing parameter is, for example, a parameter used when image correction processing such as gain correction, contrast correction, white balance correction, or gamma correction is executed.

The various pieces of setting information include setting information that specifies processing conditions for each of the copy function, the scanning function, the printing function, and the like implemented by the reading unit 102, the image forming unit 103, and the communication unit 104. For example, in the case of the copy function and the printing function, the setting information is setting information that specifies processing conditions such as paper sheet size setting and color setting (for example, black-and-white copy or color copy), and in the case of the scanning function, the setting information is setting information that specifies processing conditions such as reading resolution setting and color setting (for example, black-and-white reading or color reading). The setting information includes user setting information set by a user in addition to initial setting information. The various pieces of setting information also include a history of user setting information used by a user in the past.

In the control device 110, setting items for setting processing conditions for various functions are stored for each function in various pieces of setting information of the function control data 131 and the UI control data 132 in order to enable setting of various functions of the multi-function peripheral 100 to be performed sequentially. The "setting item" is an item for performing an operation of setting processing conditions for various functions of the multi-function peripheral 100. The multi-function peripheral 100 of this example has four main functions of the multi-function peripheral 100 including the copy function, the scanning function, the facsimile function, and the printing function, and a processing condition can be set for each of these four functions. An item for specifying the processing condition is the setting item. For example, in a case where the copy function and the printing function are selected as the functions, a paper sheet size, a color mode (for example, black-and-white copy or color copy), and the like are setting items that are set as processing conditions.

The UI control data 132 includes various pieces of screen data for configuring an operation screen displayed by the display unit 121 and various pieces of table data defining various setting items and the like displayed in an operation screen. Specifically, the storage device 113 is implemented by a recording device such as a hard disk drive (HDD), a solid state drive (SSD), or a flash memory.

The memory 112 is a work area for the CPU 111 to execute various programs, and temporarily records various programs or various pieces of data when the CPU 111 executes processing. The memory 112 includes at least one of a read only memory (ROM), a random access memory (RAM), a hard disk drive (HDD), or the like as a storage medium. The CPU 111 reads various programs including the control program 130 from the storage device 113 to the memory 112, and executes the program by using the memory 112 as a work area.

In the control device 110, the CPU 111 executes the control program 130 to implement various functions for controlling the multi-function peripheral 100. Hereinafter, a functional configuration implemented by cooperation of the CPU 111 as a hardware resource and the control program 130 as a software resource will be described. FIG. 3 is a block diagram illustrating a functional configuration of the CPU 111, and is a block diagram mainly illustrating a functional configuration that implements control of the operation panel 120.

As illustrated in FIG. 3, in the control device 110, the CPU 111 functions as a UI control unit 141 and a function control unit 144 by executing the control program 130.

The function control unit 144 controls the reading unit 102, the image forming unit 103, and the communication unit 104 while referring to the function control data based on an operation instruction input from the UI control unit 141. In addition, the function control unit 144 outputs, to the UI control unit 141, a processing execution result in the reading unit 102, the image forming unit 103, and the communication unit 104, a status, and the like.

The UI control unit 141 receives an operation instruction input from the operation panel 120 and outputs the received operation instruction to the function control unit 144. The UI control unit 141 controls the touch panel display 123. The UI control unit 141 includes a display control unit 142 and an operation receiving unit 143 as the functional configuration.

The operation receiving unit 143 receives an operation instruction according to a user's operation input from the operation panel 120, the user's operation input including a user's touch operation detected by the operation unit 122 of the touch panel display 123.

The display control unit 142 performs control to display various operation screens on the display unit 121 of the touch panel display 123 with reference to the function control data 131 and the UI control data 132. The control device 110 including the display control unit 142 is an example of a display control device according to the technology of the disclosure.

Specifically, once the operation receiving unit 143 receives an operation of supplying power to the multi-function peripheral 100, the display control unit 142 causes the display unit 121 to display the task item selection screen 200 (see FIG. 4) as a top screen, as an example. As illustrated in FIG. 4, the task item selection screen 200 is a screen for a user to select and operate a task item 201 and the like to be executed by the multi-function peripheral 100. Here, a task is processing executed by the multi-function peripheral 100 after a user sets a processing condition for a main function of the multi-function peripheral 100. Then, an item including information indicating the content of this processing is referred to as the task item 201. For example, in the case of the copy function, which is one of the main functions of the multi-function peripheral 100, processing executed by the multi-function peripheral 100 after a user sets the processing conditions such as paper sheet size setting and color setting is the task of the copy function, and an item indicating the content of the task is the task item 201. Similarly, in the case of the scanning function, processing executed by the multi-function peripheral 100 after a user sets the processing conditions such as reading resolution setting and color setting is the task of the scanning function, and an item indicating the content of the task is the task item 201.

As described above, there are various types of tasks and task items 201 indicating the contents of the tasks according to the type of function and the processing condition. A plurality of task items 201 for different types of functions and different processing conditions are displayed in the task item selection screen 200. The task item selection screen 200 is a selection screen for selecting one task item 201 from the plurality of task items 201 in the case of causing the multi-function peripheral 100 to execute one task. In this example, a plurality of task items 201 corresponding to an operation history are displayed in a list form in the task item selection screen 200.

In addition, an icon window 203 is displayed in the task item selection screen 200 while being superimposed on a portion where the task item 201 is displayed. As an example, the icon window 203 is displayed in the form of a floating window whose display position can be adjusted in the task item selection screen 200. The icon window 203 is disposed at a lower end portion of the task item selection screen 200. An icon 202 functions as a selection button for a user to select a function to be executed by the multi-function peripheral 100.

FIG. 4 illustrates icons 202A, 202B, 202C, and 202D as the icons 202. These icons correspond to the copy function, the scanning function, the facsimile function, and the printing function, which are the four main functions of the multi-function peripheral 100. The icon 202A is a selection button for selecting the copy function, and the icon 202B is a selection button for selecting the scanning function. The icon 202C is a selection button for selecting the facsimile function, and the icon 202D is a selection button for selecting the printing function. The icon 202 includes various icons other than the four icons 202A, 202B, 202C, and 202D, and the various icons can be displayed by setting, for example. Hereinafter, in a case where there is no need to distinguish the types of the icons 202, the four icons 202A, 202B, 202C, and 202D are simply referred to as the icons 202.

Figure 5:
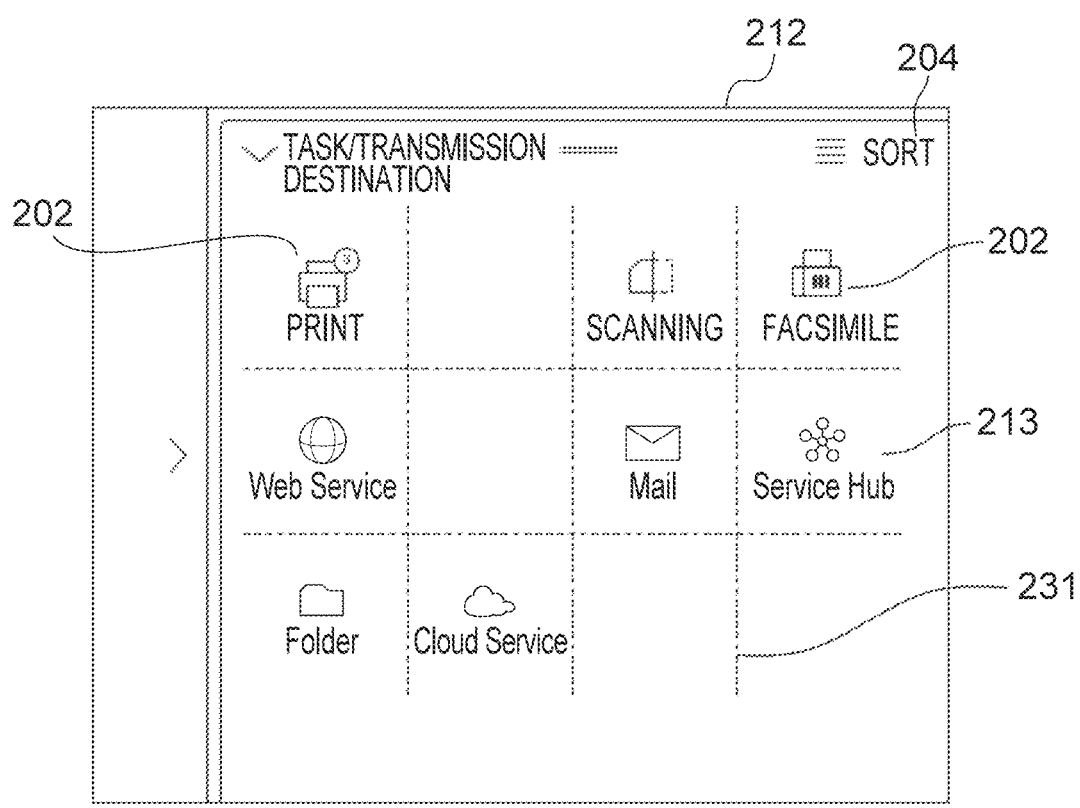
FIG. 5 is a view illustrating a function selection screen in the operation screen of the multi-function peripheral according to the first embodiment.

FIG. 5 is a view illustrating a function selection screen 212. The function selection screen 212 is a selection screen for a user to select various functions to be executed by the multi-function peripheral 100. The display control unit 142 shifts an operation screen displayed on the display unit 121 from the task item selection screen 200 to the function selection screen 212 by a predetermined operation performed on the task item selection screen 200. The predetermined operation is, for example, a flicking operation performed on a preset region of the task item selection screen 200. The function selection screen 212 includes a plurality of sections 213 in which the icons 202 corresponding to various functions to be executed by the multi-function peripheral 100 are disposed, and is a screen for a user to select an icon 202. In FIG. 5, a frame 231 of a section 213 is indicated by a broken line, but the broken line is not actually displayed. It is a matter of course that the frame 231 may be displayed.

The icons 202 are also displayed in the icon window 203 in the task item selection screen 200 illustrated in FIG. 4, but the icons 202 displayed in the icon window 203 correspond to part of the icons 202 displayed in the function selection screen 212. As described above, the icons 202 displayed in the icon window 203 correspond to the four main functions of the multi-function peripheral 100 in this example, and as the icon window 203 is provided in the task item selection screen 200, it is possible to operate the four main functions without switching to the function selection screen 212.

Once a desired icon 202 is operated on the icon window 203 of the task item selection screen 200 or the function selection screen 212, transition to a setting item selection screen 300 (see FIG. 7) corresponding to the function of the operated icon 202 is made. A processing condition for the function selected by the icon 202 can be set in the setting item selection screen 300.

Figure 6:
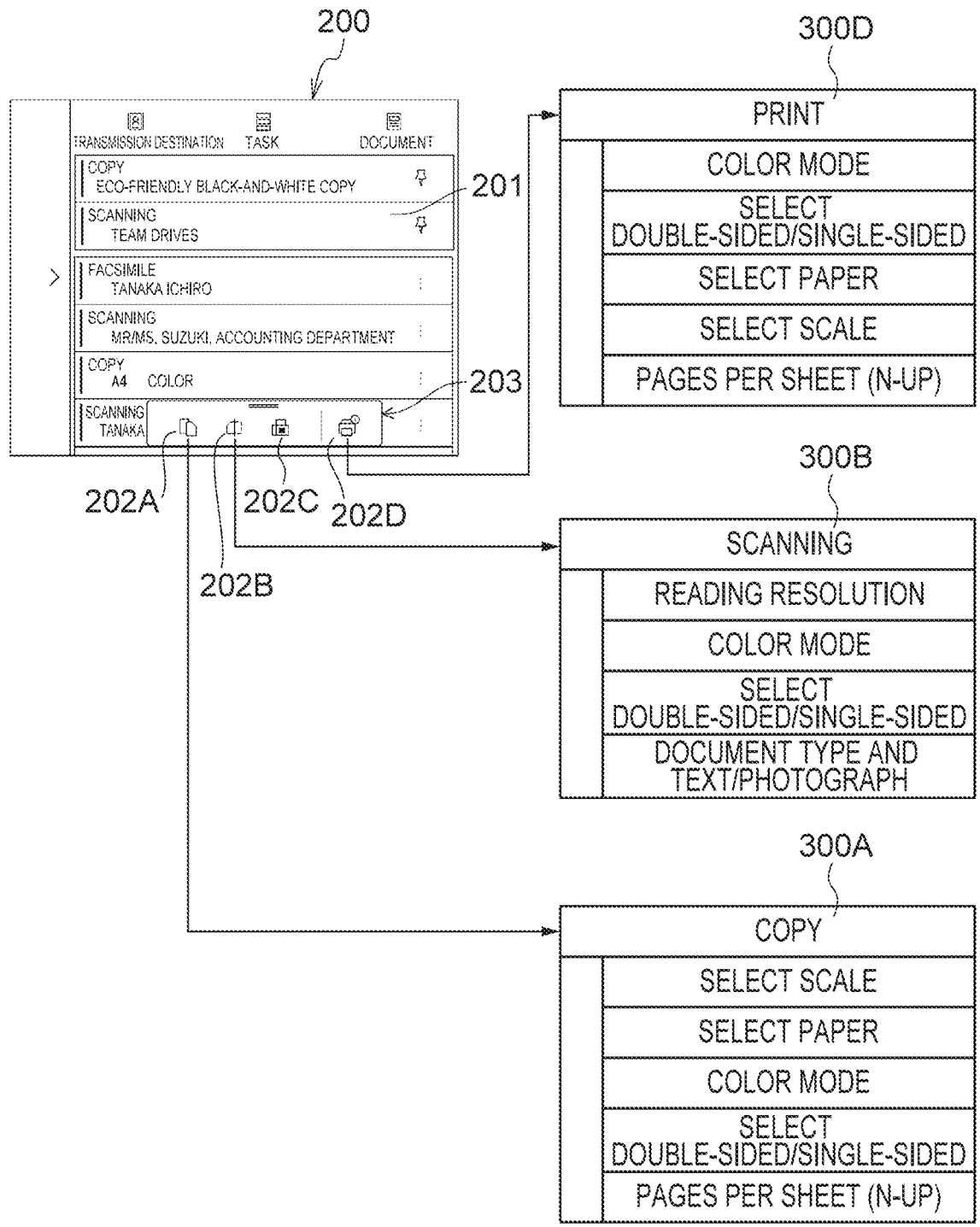
FIG. 6 is a view illustrating relevant setting items related to each setting item corresponding to a main function in the operation screen of the multi-function peripheral according to the first embodiment.

FIG. 6 illustrates setting item selection screens 300 that are displayed in a case where the icons 202 corresponding to the four main functions are operated from the icon window 203 of the task item selection screen 200. FIG. 6 illustrates setting item selection screens 300A, 300B, and 300D displayed in a case where the icon 202A corresponding to the copy function, the icon 202B corresponding to the scanning function, and the icon 202D corresponding to the printing function among the four icons 202 of the four main functions are operated. Data of the setting item selection screen 300 is included in the function control data 131 of the storage device 113.

Figure 8:
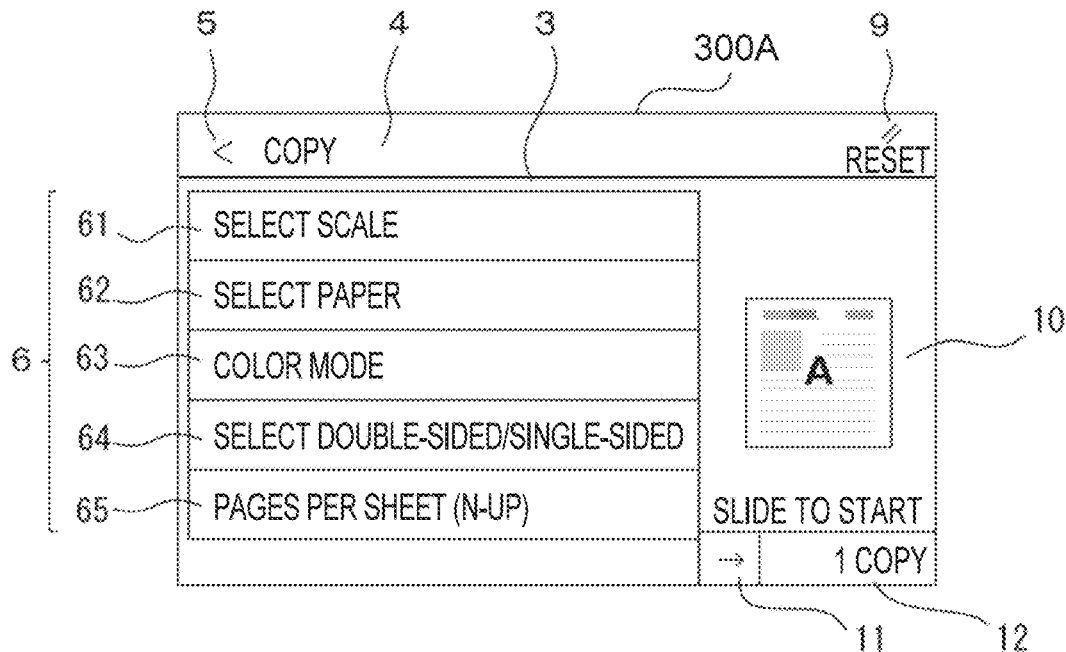
FIG. 8 is a view illustrating an initial screen in a case where a copy function is selected in the operation screen of the multi-function peripheral according to the first embodiment.

Similarly to the icons 202, in a case where it is necessary to distinguish the setting item selection screen 300 for each function, an alphabet subdivision code such as "A" or "B" is attached to Reference Sign 300, and in a case where it is not necessary to distinguish the setting item selection screen 300 for each function, an alphabet subdivision code is not attached, and the setting item selection screens 300 are simply referred to as the setting item selection screens 300. The setting item selection screen 300 in FIG. 6 is schematically illustrated for the purpose of indicating what kind of setting item is present for each function, and the display form of the actual screen is as illustrated in FIG. 8, for example, in the case of the setting item selection screen 300A for the copy function.

In a case where the icon 202A for the copy function is operated, the setting item selection screen 300A for the copy function is displayed. The processing conditions for the copy function can be set in the setting item selection screen 300A. Examples of setting items of the processing conditions for the copy function include a setting item (indicated by a scale setting button 61 in FIG. 7) for selecting a copy scale, a setting item (indicated by a paper setting button 62 in FIG. 7) for selecting a paper sheet size, a setting item (indicated by a color mode setting button 63 in FIG. 7) for selecting a color mode such as black-and-white copy or color copy, a setting item (indicated by a double-sided/single-sided setting button 64 in FIG. 7) for selecting whether double-sided printing or single-sided printing is performed, and a setting item (indicated by an N-up setting button 65 in FIG. 7) of an N-up function (indicated as "pages per sheet (N-up)" in the drawing). The N-up function is a function of collectively copying a plurality of (two, four, or eight) documents on one sheet, and as this function is used, two, four, or eight documents reduced in size can be copied on a selected sheet.

In a case where the icon 202B for the scanning function is operated, the setting item selection screen 300B for the scanning function is displayed. The processing conditions for the scanning function can be set in the setting item selection screen 300B. Examples of setting items of the processing conditions for the scanning function include a setting item for selecting "reading resolution", a setting item "color mode" for selecting a color mode, a setting item "select double-sided/single-sided" for selecting whether to perform double-sided reading or single-sided reading, and a setting item "document type and text/photograph" for selecting a type of a document to be read (whether the document includes characters or a photograph).

In a case where the icon 202D for the printing function is operated, the setting item selection screen 300D for the printing function is displayed. The processing conditions for the printing function can be set in the setting item selection screen 300D. Examples of setting items of the processing conditions for the printing function include a setting item "color mode" for selecting a color mode, a setting item "select double-sided/single-sided" for selecting double-sided printing or single-sided printing, a setting item "select paper" for selecting a paper sheet size, a setting item "select scale" for selecting a print scale, and a setting item for an N-up function (indicated as "pages per sheet (N-up)" in the drawing) for setting whether or not to print a plurality of pages on a paper sheet.

The setting items set in each setting item selection screen 300 are hierarchically configured. The setting items shown in each setting item selection screen 300 of FIG. 6 are setting items in a first layer for each function.

Figure 7:
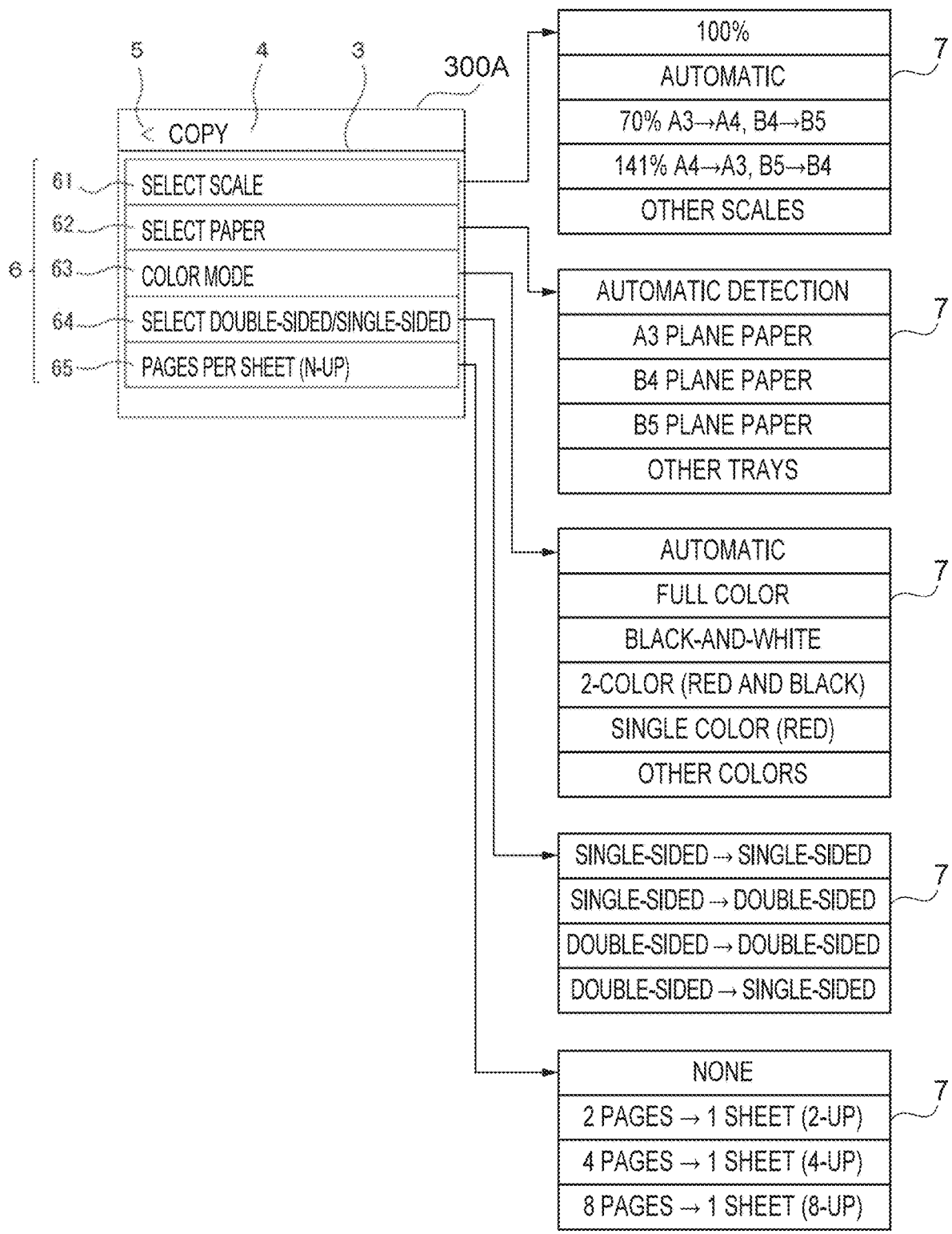
FIG. 7 is a view illustrating first-layer relevant setting items and second-layer relevant setting items related to each relevant setting item in a case where copy is selected in the operation screen of the multi-function peripheral according to the first embodiment.

In FIG. 7, the hierarchical structure of the setting items will be described using the setting item selection screen 300A for the copy function as an example. As illustrated in FIG. 7, the setting item selection screen 300A for the copy function includes the setting items in the first layer and setting items in a second layer that are related to the setting contents of the setting items in the first layer and are obtained by subdividing the setting contents of the first layer, and the setting items are hierarchically configured. There are a plurality of setting items in the first layer, and there are a plurality of setting items in the second layer for each setting item in the first layer.

In the example of FIG. 7, the setting items in the first layer for the copy function include, as described above, the setting item "select scale", the setting item "select paper", the setting item of "color mode", the setting item "select double-sided/single-sided", the setting item for the N-up function (indicated as "pages per sheet (N-up)" in the drawing), and the like. The setting items in the first layer are displayed in a list form by being arranged in a vertical direction in a first-layer setting item display region 6.

The setting items in the second layer for the copy function include, for example, a setting item for selecting "100%" which is an actual size, a setting item for selecting "automatic" for automatically determining a scale according to a paper sheet size, and a setting item for selecting a scale such as "70%" or "141%", for the setting item "select scale" in the first layer.

The setting items in the second layer include a setting item for selecting "automatic detection" for automatically detecting a paper sheet, and setting items such as "A3 plain paper" for selecting an A3-sized plain paper sheet, "B4 plain paper" for selecting a B4-sized plain paper sheet, "B5 plain paper" for selecting a B5-sized plain paper sheet, and "other trays", for the setting item "select paper" in the first layer. The setting items in the second layer include setting items such as "automatic" for automatically setting a color mode according to the type of the document, "full color", "black and white", "2-color (red and black)", "single color (red)", and "other colors", for the setting item "color mode" in the first layer. The setting items in the second layer include setting items such as "single-sided→single-sided", "single-sided→double-sided", "double-sided→double-sided", and "double-sided→single-sided" for the setting item "select double-sided/single-sided" in the first layer.

The setting items in the second layer include a setting item "none" that does not combine pages into one sheet, a setting item "2 pages→1 sheet (2-up)" to combine two pages into one sheet, a setting item "4 pages→1 sheet (4-up)" to combine four pages into one sheet, a setting item "8 pages→1 sheet (8-up)" to combine eight pages into one sheet, and the like, for the setting item for the N-up function (indicated as "pages per sheet (N-up)" in the drawing) in the first layer.

Moreover, setting items in a third layer include a setting item "layout order" for selecting an order of layout (left→right/top→bottom) when two pages are combined into one sheet, a setting item "document setting direction" (see FIG. 11), and the like, for the setting item "2 pages→1 sheet (2-up)" in the second layer.

Figure 10:
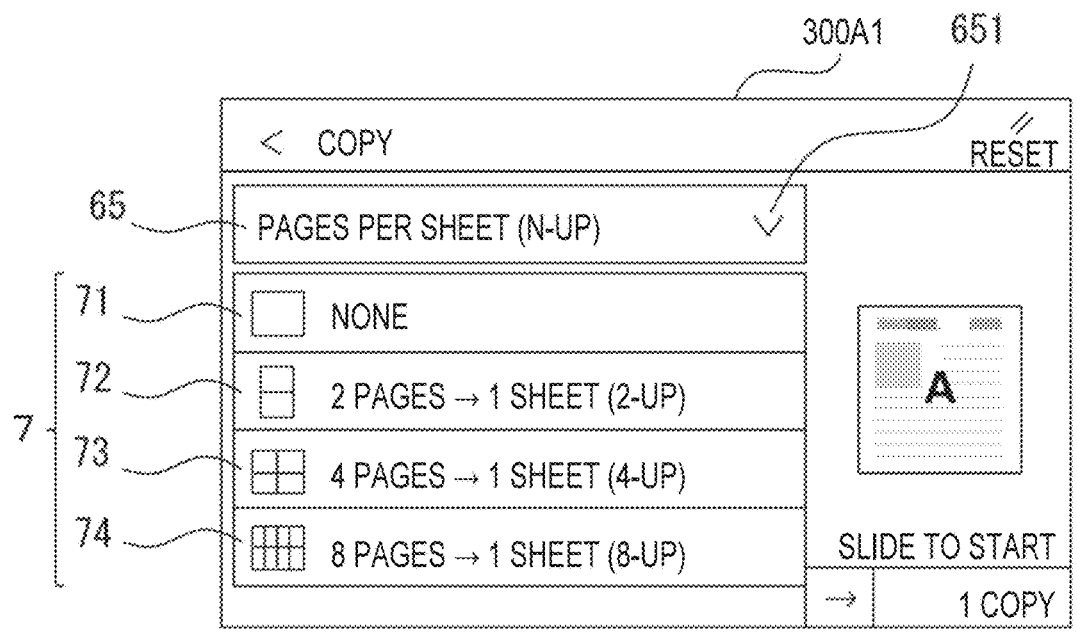
FIG. 10 is a view illustrating the operation screen in a case where a first-layer setting item in the operation screen of the multi-function peripheral according to the first embodiment is selected (for example, in a case where an N-up setting button is selected).

In a case where a setting item in the first layer is selected, setting items in the second layer are displayed in a second-layer setting item display region 7 (see FIG. 10). The setting items in the second layer are displayed in a list form by being arranged in the vertical direction in the second-layer setting item display region 7, similarly to the first-layer setting item display region 6. In a case where a setting item in the second layer is selected, setting items in the third layer are displayed in a third-layer setting item display region 8 (see FIG. 11). The setting items in the third layer are displayed in a list form by being arranged in the vertical direction in the third-layer setting item display region 8, similarly to the second-layer setting item display region 7.

Here, the setting items in the second layer are referred to as "relevant setting items" for the setting items in the first layer, and the setting items in the third layer are referred to as "relevant setting items" for the setting items in the second layer. That is, in a case where setting items for which a setting operation is performed have a hierarchical structure as in the setting item selection screen 300, if an item in a certain layer is set as a setting item, a setting item that is related to each setting item and is in a lower layer than that of each setting item is referred to as a "relevant setting item". Here, the "relevant setting item" is a relative concept. For example, in a case where setting items are configured in two layers, the first layer and the second layer, if items in the first layer are "setting items", items in the second layer are "relevant setting items" as described above. Further, in a case where setting items are configured in three layers, the first layer to the third layer, items in the second layer are "relevant setting items" in relation to items in the first layer, and items in the third layer are also "relevant setting items" in relation to the items in the second layer. That is, the "relevant setting item" is defined in relation to a setting item in the immediately higher layer. The "relevant setting item" is a setting item related to a selected setting item that is an arbitrary setting item selected by an operator from among a plurality of setting items.

The pieces of data of the setting items having the hierarchical structure are recorded in the function control data 131 and the UI control data 132 while associating the setting items with each other.

More specifically, the setting item selection screen 300 is displayed as illustrated in FIG. 8. The setting item selection screen 300 illustrated in FIG. 8 is an example of an initial screen of the setting item selection screen 300A in a case where the copy function is selected by the icon 202A. The setting item selection screen 300A illustrated in FIG. 8 is closer to an actual display form than the setting item selection screen 300A illustrated in FIGS. 6 and 7 is.

A main function display line 3 colored in yellow is displayed as an index indicating that the currently selected main function of the multi-function peripheral 100 is the copy function on the upper side of the setting item selection screen 300A. The main function display line 3 is a line having a preset color that indicates which function is the currently selected main function among the main functions of the multi-function peripheral 100 such as the copy function, the printing function, the scanning function, and the facsimile function, and a line colored in a different color according to the selected main function is displayed. For example, a line colored in a different color for each main function, such as a yellow line for the copy function, a purple line for the printing function, a blue line for the scanning function, and a green line for the facsimile function, is displayed. Here, a setting item that is selected is a selected setting item, and the main function display line 3 is an example of an identification portion for identification of the selected setting item.

A selected item display region 4 in which the currently selected item is displayed with characters is provided above the main function display line 3, and characters "copy" which indicate the currently selected main function are displayed in the initial screen of the setting item selection screen 300A in a case where the copy function is selected. In the selected item display region 4, characters "print" are displayed in the initial screen in a case where the printing function is selected, characters "scanning" are displayed in the initial screen in a case where the scanning function is selected, and characters "fax" are displayed in the initial screen in a case where the facsimile function is selected.

A return button 5 for returning a display state of the setting item selection screen 300A to a display state before an item displayed in the selected item display region 4 is selected is provided on the left side of the selected item display region 4. By tapping the return button 5, it is possible to return to a display state before the copy function displayed in the selected item display region 4 is selected, for example, a screen for selecting any of the main functions of the multi-function peripheral 100 such as the copy function, the printing function, the scanning function, and the facsimile function, such as the task item selection screen 200 illustrated in FIGS. 4 and 6 or the function selection screen 212 illustrated in FIG. 5.

The first-layer setting item display region 6 in which setting items for setting processing conditions for the copy function, that is, a plurality of setting items associated with the copy function, are displayed in a list form is provided below the main function display line 3. In the first-layer setting item display region 6, setting items "select scale", "select paper", "color mode", "select double-sided/single-sided", and "pages per sheet (N-up)" are displayed as the scale setting button 61, the paper setting button 62, the color mode setting button 63, the double-sided/single-sided setting button 64, and the N-up setting button 65, respectively. An operator can select a desired setting item from among the setting items displayed in the first-layer setting item display region 6 by tapping any of the scale setting button 61, the paper setting button 62, the color mode setting button 63, the double-sided/single-sided setting button 64, and the N-up setting button 65.

A setting state display region 10 for displaying an image of the current setting state is provided on the right side of the first-layer setting item display region 6. An initial setting state in which "select scale" is set to "actual size", "select paper" is set to "A4 vertical", "color mode" is set to "full color", "select double-sided/single-sided" is set to "single-sided", and "pages per sheet (N-up)" is set to "none" is displayed in the initial screen in a case where the copy function is selected.

A start button 11 for execution of the copy function and a number-of-copies button 12 for confirming and changing the number of copies are provided below the setting state display region 10. An arrow "→" is displayed on the start button 11, and in a case where the copy function is desired to be executed, the copy function is executed by touching the start button 11 and performing a swipe operation in a direction of the arrow. In a case where it is desired to change the number of copies, a number-of-copies setting screen appears (not illustrated) once the number-of-copies button 12 is tapped, and the number of copies can be changed by setting a desired number of copies in the number-of-copies setting screen.

Figure 9:
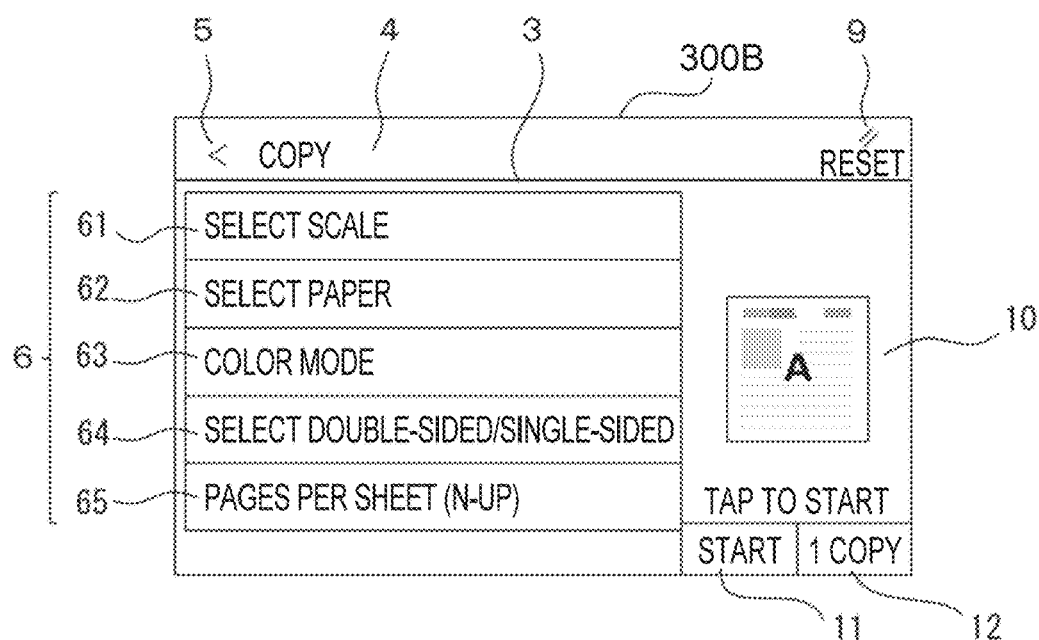
FIG. 9 is a view illustrating an example in which a start button in the operation screen of the multi-function peripheral according to the first embodiment is displayed as a normal button (for example, a tap button).

The start button 11 can be switched to a slide button or a normal button according to a setting registered in the multi-function peripheral 100 in advance. FIG. 9 illustrates a modified example of the setting item selection screen 300A in a case where the start button 11 is displayed as a normal button. As illustrated in FIG. 9, in a case where the start button 11 is displayed as a normal button, the copy function is executed by tapping the start button 11. Switching between the slide button and the normal button will be described later.

The display control unit 142 performs the following display control in the case of displaying setting items having the hierarchical structure in the setting item selection screen 300. The setting item selection screen 300 is an example of an operation screen. The display control performed by the display control unit 142 will be described with reference to FIGS. 8 and 10 to 13 using a setting operation for the "N-up" function in the copy function of the multi-function peripheral 100 as an example.

In a case where it is desired to select "pages per sheet (N-up)" among the setting items displayed in the first-layer setting item display region 6, the N-up setting button 65 on which characters "pages per sheet (N-up)" are displayed is tapped in the initial screen of the setting item selection screen 300A in a case where the copy function is selected as illustrated in FIG. 8.

FIG. 10 is a view illustrating a setting item selection screen 300A1 (for example, a screen in a case where a first-layer setting item is selected) in a case where "pages per sheet (N-up)" is selected from the setting items displayed in the first-layer setting item display region 6.

As illustrated in FIG. 10, setting items in the first layer other than "pages per sheet (N-up)" which is the selected setting item in the first layer are hidden in the setting item selection screen 300A1 in a case where a first-layer setting item is selected. For example, in this example, the setting item for the N-up function is selected by selecting the N-up setting button 65 as the setting item in the first layer. Therefore, among the setting items in the first layer, setting items other than the N-up function, which are indicated by the scale setting button 61, the paper setting button 62, and the like, are hidden in the first-layer setting item display region 6. In the setting item selection screen 300A1, "pages per sheet (N-up)" (that is, the N-up setting button 65), which is the selected setting item in the first layer, is displayed on the upper side of the first-layer setting item display region 6, that is, at a display position of a setting item in the uppermost row of the first-layer setting items that were displayed in a list form. A non-display setting item indicator 651 for indicating that there is a setting item (for example, the scale setting button 61, the paper setting button 62, or the like) that is hidden and is in the same layer as that of "pages per sheet (N-up)" is displayed at the right end of "pages per sheet (N-up)" (that is, the N-up setting button 65) displayed in the setting item selection screen 300A1.

In the setting item selection screen 300A1 in a case where a first-layer setting item is selected, the second-layer setting item display region 7 additionally appears below the N-up setting button 65. In the second-layer setting item display region 7, relevant setting items, "none" (that is, a non-N-up setting button 71), "2-up" (that is, a 2-up setting button 72), "4-up" (that is, a 4-up setting button 73), and "8-up" (that is, an 8-up setting button 74), are displayed in a list form as second-layer setting items associated with "pages per sheet (N-up)" which is the selected setting item in the first layer. An operator can select a desired relevant setting item from among the relevant setting items displayed in the second-layer setting item display region 7 by tapping any of the non-N-up setting button 71, the 2-up setting button 72, the 4-up setting button 73, and the 8-up setting button 74.

In a case where it is desired to select the setting item "2-up" among the setting items in the second layer as the relevant setting items displayed in the second-layer setting item display region 7, the 2-up setting button 72 is tapped in the setting item selection screen 300A1 in a case where a first-layer setting item is selected when the copy function is selected as illustrated in FIG. 10.

Figure 11:
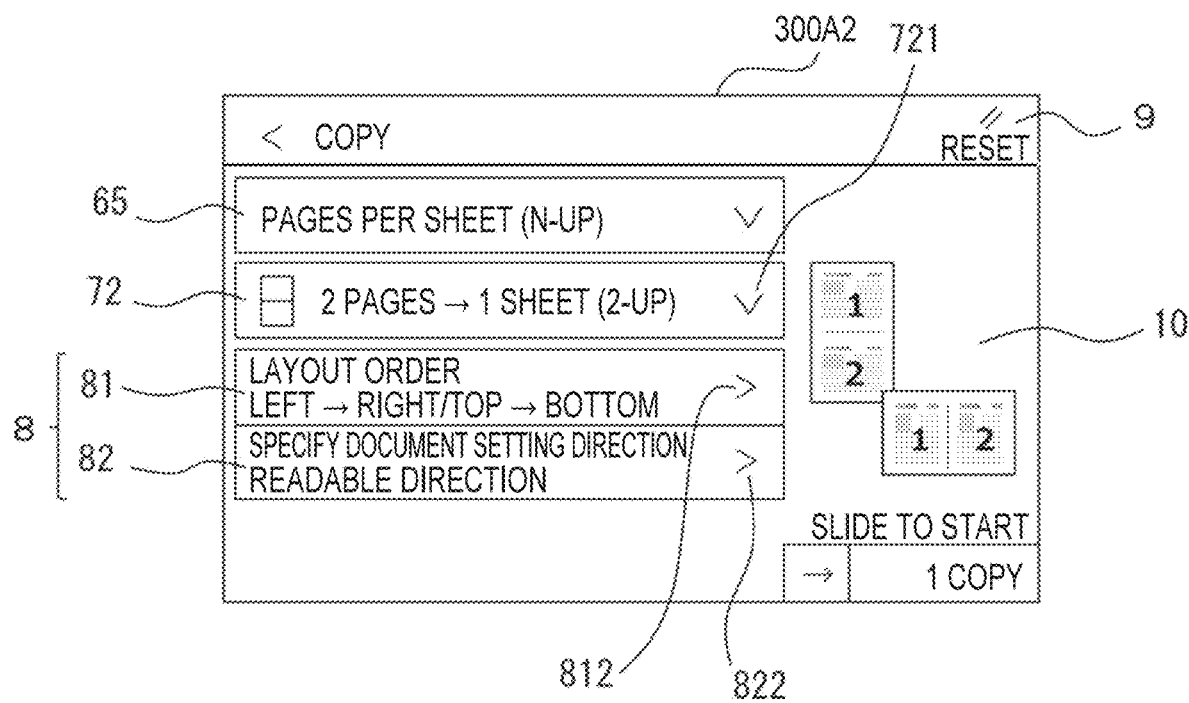
FIG. 11 is a view illustrating the operation screen in a case where a second-layer setting item in the operation screen of the multi-function peripheral according to the first embodiment is selected (for example, in a case where a 2-up setting button is selected).

FIG. 11 is a view illustrating a setting item selection screen 300A2 (for example, a screen in a case where a second-layer setting item is selected) in a case where "2-up" is selected from the second-layer setting items displayed in the second-layer setting item display region 7.

As illustrated in FIG. 11, setting items in the second layer other than "2-up" which is the selected setting item in the second layer are hidden in the setting item selection screen 300A2 in a case where a second-layer setting item is selected. For example, the setting item for the 2-up function is selected by selecting the 2-up setting button 72 as the setting item in the second layer. Therefore, among the setting items in the second layer, setting items other than the 2-up function, which are indicated by the non-N-up setting button 71, the 4-up setting button 73, the 8-up setting button 74, and the like, are hidden in the second-layer setting item display region 7. In the setting item selection screen 300A2, "2-up" (that is, the 2-up setting button 72), which is the selected setting item in the second layer, is displayed on the upper side of the second-layer setting item display region 7, that is, at a display position of a setting item in the uppermost row of the second-layer setting items that were displayed in a list form. A non-display setting item indicator 721 for indicating that there is a setting item (for example, the 4-up setting button 73, the 8-up setting button 74, or the like) that is hidden and is in the same layer as that of "2-up" is displayed at the right end of "2-up" (that is, the 2-up setting button 72) displayed in the setting item selection screen 300A2 in a case where a second-layer setting item is selected.

In the setting item selection screen 300A2 in a case where a second-layer setting item is selected, the third-layer setting item display region 8 additionally appears below the 2-up setting button 72. In the third-layer setting item display region 8, the setting items "layout order" (that is, a layout order setting button 81) and "document setting direction" (that is, a document setting direction setting button 82) are displayed in a list form as setting items associated with "2-up" which is a selected setting item in the second layer. Indicators 812 and 822 for indicating that transition to a screen for setting each item can be made are displayed at the right ends of the layout order setting button 81 and the document setting direction setting button 82, respectively. An operator can select any of setting items displayed in the third-layer setting item display region 8 by a tapping operation, thereby selecting a desired setting item from the setting items displayed in the third-layer setting item display region 8 and changing the setting in each setting screen (not illustrated) if necessary. In a case where the 2-up function is selected, the initial setting of "layout order" is such that, in a case where pages are arranged in the lateral direction, the first page is positioned on the left, the second page is positioned on the right (left→right), and in a case where pages are arranged in the vertical direction, the first page is positioned on the top, and the second page is positioned on the bottom (top→bottom). In a case where the 2-up function is selected, the initial setting of "document setting direction" is "readable direction".

The display state of "pages per sheet (N-up)" (that is, the N-up setting button 65) which is the selected setting item in the first layer in the screen in a case where a first-layer setting item is selected is maintained in the setting item selection screen 300A2 in a case where a second-layer setting item is selected.

The image display in the setting state display region 10 of the screen in a case where a second-level setting item is selected when the 2-up function is selected indicates that the current setting state is the initial setting state of 2-up. Reference Sign 9 in the drawing denotes a reset button for resetting a setting operation from when the copy function is selected to the present time and returning to the top screen of the multi-function peripheral 100.

The setting item selection screen 300A2 illustrated in FIG. 11 as described above is configured such that an operation system for the setting item for the N-up function can be viewed. That is, by viewing the setting item selection screen 300A2, an operator can immediately understand that the current operation status is as follows: "copy" is selected as the main function, "2-up" is selected in the "pages per sheet (N-up)" function, "layout order" in "2-up" is set to "left→right/top→bottom", and "document setting direction" is set to "readable direction".

Figure 12:
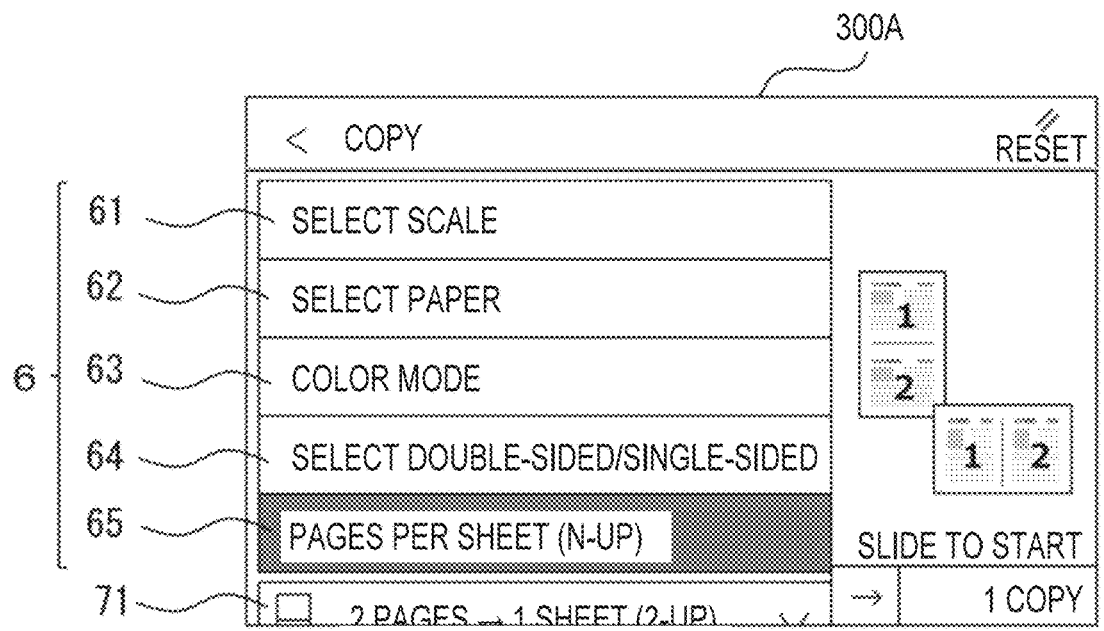
FIG. 12 is a view illustrating a state in which a first-layer setting item in the operation screen of the multi-function peripheral according to the first embodiment is displayed again.

FIG. 12 is a view illustrating a display state of the setting item selection screen 300A in a case where "pages per sheet (N-up)" (that is, the N-up setting button 65), which is the selected setting item in the first layer, is reselected by a tapping operation in the setting item selection screen 300A2 in a case where a second-layer setting item is selected as illustrated in FIG. 11. As illustrated in FIG. 12, the N-up setting button 65 is reselected, thereby reproducing the first-layer setting item display region 6. In this example, the hidden first-layer setting items "select scale" (that is, the scale setting button 61), "select paper" (that is, the paper setting button 62), "color mode" (that is, the color mode setting button 63), "select double-sided/single-sided" (that is, the double-sided/single-sided setting button 64), and "pages per sheet (N-up)" (that is, the N-up setting button 65) are displayed in a list form again in the order in which they were originally displayed.

At this time, "pages per sheet (N-up)" (that is, the N-up setting button 65) is highlighted in order to display the currently selected setting item in a recognizable manner. Once a desired setting item is selected from the redisplayed first-layer setting items by a tapping operation, setting items other than the selected setting item are hidden, and the selected setting item is displayed on the upper side of the first-layer setting item display region 6 as illustrated in FIG. 10. The second-layer setting item display region 7 appears below the selected setting item, and setting items associated with the selected setting item are displayed in a list form as the setting items in the second layer. That is, the setting item selection screen 300A illustrated in FIG. 12 is substantially the same as the setting item selection screen 300A illustrated in FIG. 8, but is different from the setting item selection screen 300A in that the reselected N-up setting button 65 is highlighted, and display of the setting state display region 10 is different. The setting state display region 10 shows a state in which the 2-up setting is selected.

Figure 13:
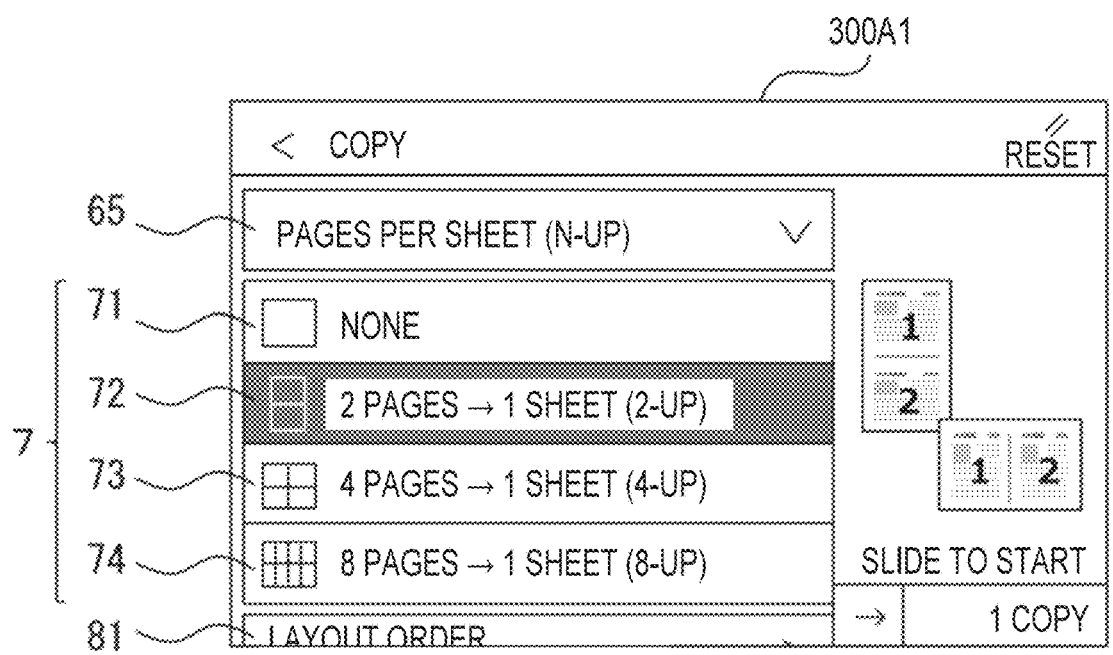
FIG. 13 is a view illustrating a state in which a second-layer setting item in the operation screen of the multi-function peripheral according to the first embodiment is displayed again.

FIG. 13 is a view illustrating a display state of the setting item selection screen 300A1 in a case where "2-up" (that is, the 2-up setting button 72), which is the selected setting item in the second layer, is reselected by a tapping operation in the setting item selection screen 300A2 in a case where a second-layer setting item is selected as illustrated in FIG. 11. As illustrated in FIG. 13, the second-layer setting item display region 7 is reproduced by reselecting the 2-up setting button 72, and the hidden second-layer setting items "none" (that is, the non-N-up setting button 71), "4-up" (that is, the 4-up setting button 73), "8-up" (that is, the 8-up setting button 74), and "2-up" (that is, 2-up setting button 72) are displayed in a list form again in the order in which they were originally displayed.

At this time, "2-up" (that is, the 2-up setting button 72) is highlighted in order to display the currently selected setting item in a recognizable manner. Once a desired setting item is selected from the redisplayed second-layer setting items by a tapping operation, setting items (excluding the selected setting item in the first layer) other than the selected setting item in the second layer are hidden, and the selected setting item in the second layer is displayed on the upper side of the second-layer setting item display region 7 as illustrated in FIG. 11. The third-layer setting item display region 8 appears below the selected setting item, and setting items associated with the selected setting item are displayed in a list form as the setting items in the third layer. That is, the setting item selection screen 300A1 illustrated in FIG. 13 is substantially the same as the setting item selection screen 300A1 illustrated in FIG. 10, but is different from the setting item selection screen 300A1 in that the reselected 2-up setting button 72 is highlighted, and display of the setting state display region 10 is different. The setting state display region 10 shows a state in which the 2-up setting is selected.

In summary, in a case where an arbitrary setting item is selected from a plurality of setting items displayed in a list form in the setting item selection screen 300 which is an example of an operation screen, the display control unit 142 hides setting items other than the selected setting item. The display control unit 142 displays the selected setting item on the upper side of a display region in which the plurality of setting items were displayed in a list form, and additionally displays a relevant setting item below the selected setting item.

More specifically, in a case where an arbitrary setting item is selected from setting items for setting various functions of the multi-function peripheral 100, the display control unit 142 hides setting items other than the selected setting item, the setting items having been displayed as setting items in the same layer as that of the selected setting item. At the same time, the display control unit 142 displays the selected setting item on the upper side of a display region for the setting items that were displayed in a list form as the setting items in the same layer as that of the selected setting item, and additionally displays a relevant setting item associated with the selected setting item below the selected setting item.

Here, "hiding setting items other than the selected setting item" means hiding setting items other than the selected setting item among setting items displayed as setting items in the same layer as that of the selected setting item. "Displaying the selected setting item on the upper side of a display region in which the plurality of setting items were displayed in a list form" means displaying the selected setting item on the upper side of a display region in which setting items in the same layer as that of the selected setting item were displayed. For example, in a case where four setting items are displayed in a list form, when a setting item in the third row is selected, setting items other than the setting item in the third row (that is, the selected setting item) are hidden. The selected setting item (that is, the setting item displayed in the third row) is displayed at a position where the setting item in the first row was displayed.

In a case where the selected setting item is reselected in a state in which setting items other than the selected setting item are hidden, the display control unit 142 redisplays the hidden setting items.

Here, "redisplaying, in a case where the selected setting item is reselected in a state in which setting items other than the selected setting item are hidden, the hidden setting items" means redisplaying, in a case where the selected setting item is reselected in a state in which setting items other than the selected setting item are hidden as one of a plurality of setting items displayed in a list form is selected, the hidden setting items in the same layer as that of the selected setting item. When the hidden setting items are redisplayed, the selected setting item and the hidden setting items may be again displayed in a list form in the order in which they were originally displayed or may be displayed in a changed order. In short, the hidden setting items are only required to be displayed in a list form again together with the selected setting item.

Next, the operation of the multi-function peripheral 100 will be described with reference to flowcharts of FIGS. 14, 15, and 16.

Figure 14:
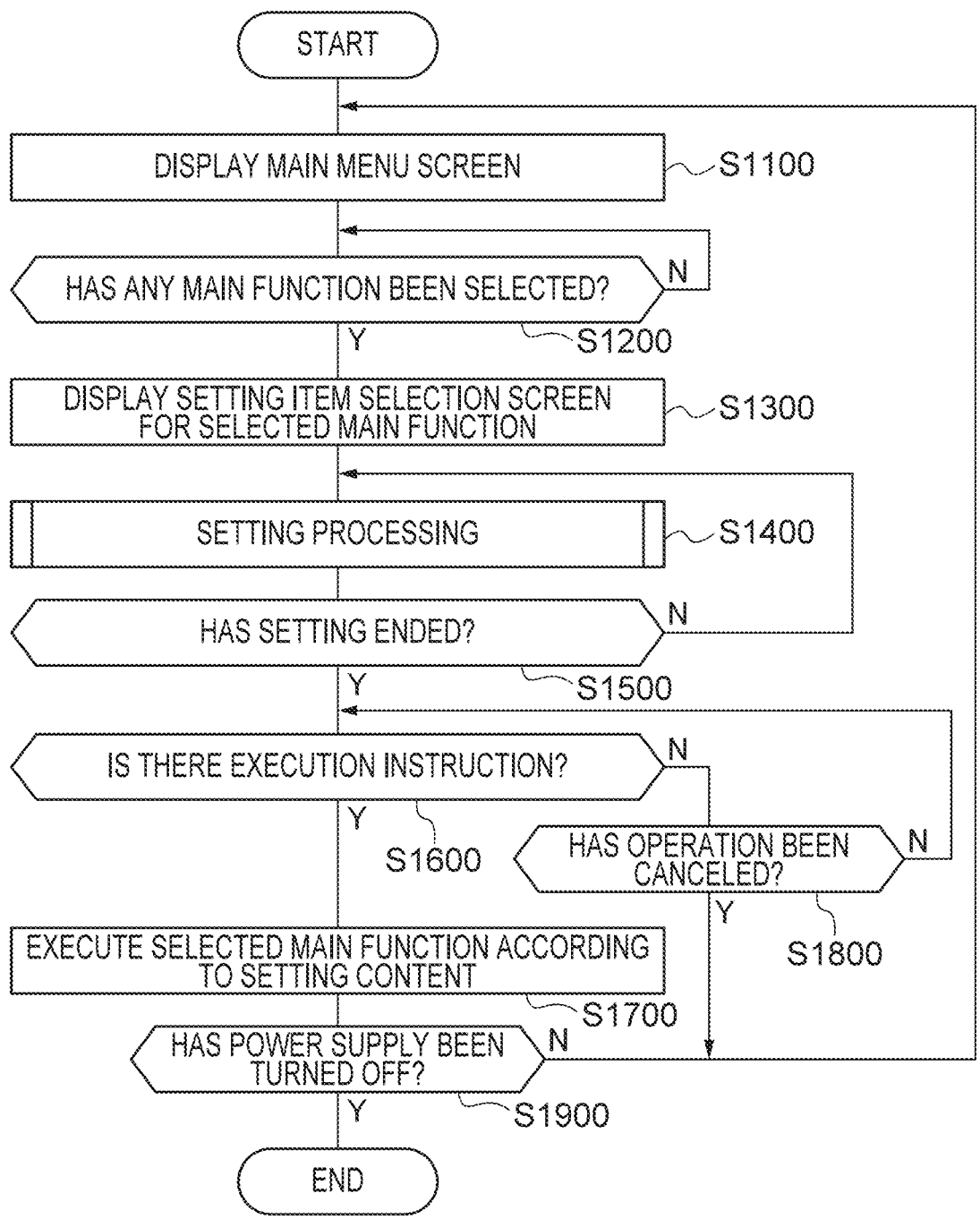
FIG. 14 is a flowchart illustrating a flow of main function display control processing executed by the display control device.

FIG. 14 is a flowchart illustrating a flow of main function display control processing executed by the CPU 111 of the control device 110. As illustrated in FIG. 14, the CPU 111 displays a main menu screen as an operation screen on the touch panel display 123 (Step S1100). The main menu screen is, for example, an operation screen in which the icons 202 are displayed, such as the task item selection screen 200 illustrated in FIG. 4 or the function selection screen 212 illustrated in FIG. 5. Icons by which the main functions can be selected, such as the copy function icon 202A, the scanning function icon 202B, the facsimile function icon 202C, and the printing function icon 202D, are displayed as the icons 202 in the main menu screen.

The CPU 111 determines whether or not any of the main functions has been selected from the main menu screen (Step S1200). In a case where any of the main functions has not been selected from the main menu screen (NO in Step S1200), the CPU 111 waits until any of the main functions is selected.

In a case where any of the main functions has been selected from the main menu screen (YES in Step S1200), the CPU 111 displays a setting item selection screen for the selected main function (Step S1300). For example, in a case where the icon 202A for the copy function has been selected from the main menu screen, the setting item selection screen 300A for setting the processing conditions for the copy function is displayed as illustrated in FIG. 8.

The CPU 111 executes setting processing for setting items of the processing conditions for the copy function according to a setting operation performed through the setting item selection screen 300A (Step S1400). The setting processing will be described later.

The CPU 111 determines whether or not setting based on the setting processing has ended (Step S1500). In a case where the setting based on the setting processing has not ended (NO in Step S1500), the CPU 111 returns to the processing of Step S1400.

In a case where the setting based on the setting processing has ended (YES in Step S1500), the CPU 111 determines whether or not there is an instruction to execute processing for the selected function such as the copy function (Step S1600). For example, it is determined whether or not there is an execution instruction such as a tapping operation on the start button 11 in the setting screen of the copy function illustrated in FIG. 9.

In a case where there is an instruction to execute the processing (YES in Step S1600), the CPU 111 executes the selected main function according to a setting content (Step S1700). For example, in a case where a tapping operation is performed on the start button 11 in the setting screen for the copy function illustrated in FIG. 9, processing of the icon 202A for the copy function is executed.

In a case where there is no instruction to execute the processing (NO in Step S1600), the CPU 111 determines whether or not the operation has been canceled (Step S1800). For example, after a tapping operation is performed on the start button 11, it is determined whether or not the start of the copy function has been canceled. For example, in a case where a tapping operation is performed on a stop button (not illustrated), it is determined that the start of the copy function has been canceled.

In a case where the operation has not been canceled (NO in Step S1800), the CPU 111 returns to the processing of Step S1600.

In a case where the operation has been canceled (YES in Step S1800), the CPU 111 returns to the processing of Step S1100.

After the processing of Step S1700, the CPU 111 determines whether or not a power supply has been turned off (Step S1900). In a case where the power supply has not been turned off (NO in Step S1900), the CPU 111 returns to the processing of Step S1100.

In a case where the power supply has been turned off (YES in Step S1900), the CPU 111 ends the main function display control processing.

Figure 15:
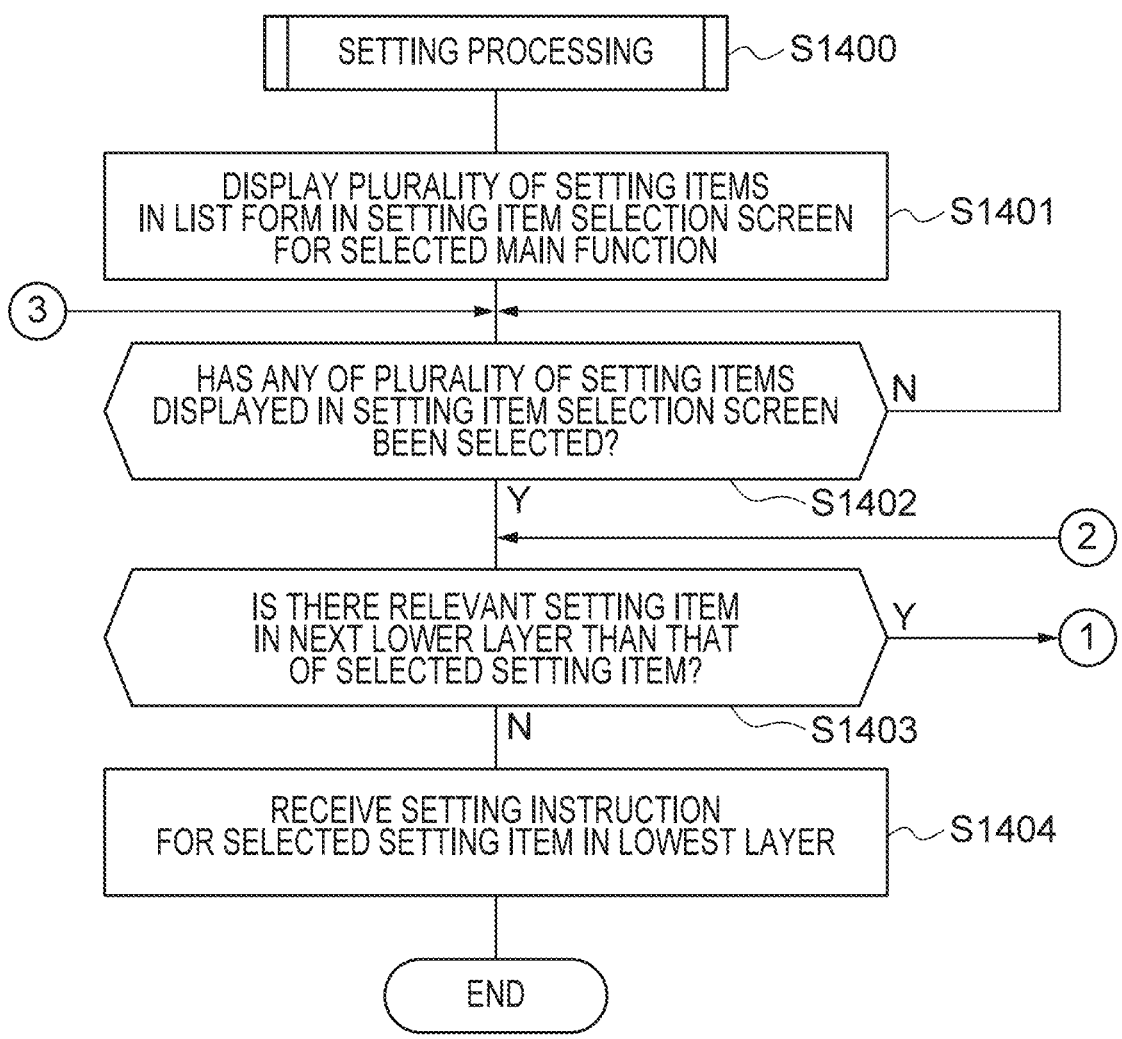
FIG. 15 is a flowchart illustrating a flow of setting item display control processing executed by the display control device.

FIG. 15 is a flowchart illustrating a flow of the setting processing executed by the CPU 111 in Step S1400 of FIG. 14. In the setting processing, the CPU 111 receives a setting operation through the setting item selection screen 300 and sets a processing condition according to the received setting operation. The CPU 111 controls display of the setting item selection screen 300 according to the setting operation on the setting item selection screen 300.

As illustrated in FIG. 15, the CPU 111 executes the setting processing (Step S1400). First, the CPU 111 displays a plurality of first-layer setting items in a list form in the first-layer setting item display region 6 in the setting item selection screen 300 for the selected main function (Step S1401). For example, the setting item selection screen 300A illustrated in FIG. 8 is displayed in a case where "copy" is selected as the main function. The setting items "select scale", "select paper", "color mode", "select double-sided/single-sided", and "pages per sheet (N-up)" are displayed in a list form as the scale setting button 61, the paper setting button 62, the color mode setting button 63, the double-sided/single-sided setting button 64, and the N-up setting button 65, respectively, in the first-layer setting item display region 6 in the setting item selection screen 300A.

The CPU 111 determines whether or not any of the plurality of setting items displayed in the setting item selection screen 300 has been selected (Step S1402). For example, an operator performs a tapping operation on any one of the scale setting button 61, the paper setting button 62, the color mode setting button 63, the double-sided/single-sided setting button 64, and the N-up setting button 65 in the setting item selection screen 300A illustrated in FIG. 8. As a result, any of the setting items including "select scale", "select paper", "color mode", "select double-sided/single-sided", and the N-up function ("pages per sheet (N-up)" in FIG. 8) is selected.

In a case where none of the plurality of setting items displayed in the setting item selection screen 300 is selected (NO in Step S1402), the CPU 111 waits until any of the plurality of setting items displayed in the setting item selection screen 300 is selected.

In a case where any of the plurality of setting items displayed in the setting item selection screen 300 has been selected (YES in Step S1402), the CPU 111 determines whether or not there is a relevant setting item in the next lower layer than that of the selected setting item (Step S1403). For example, in a case where the setting item for the N-up function has been selected in the setting item selection screen 300A illustrated in FIG. 8, since relevant setting items are set in the next lower layer (see FIG. 7), the CPU 111 determines that there is a relevant setting item in the next lower layer than that of the setting item for the N-up function.

Figure 16:
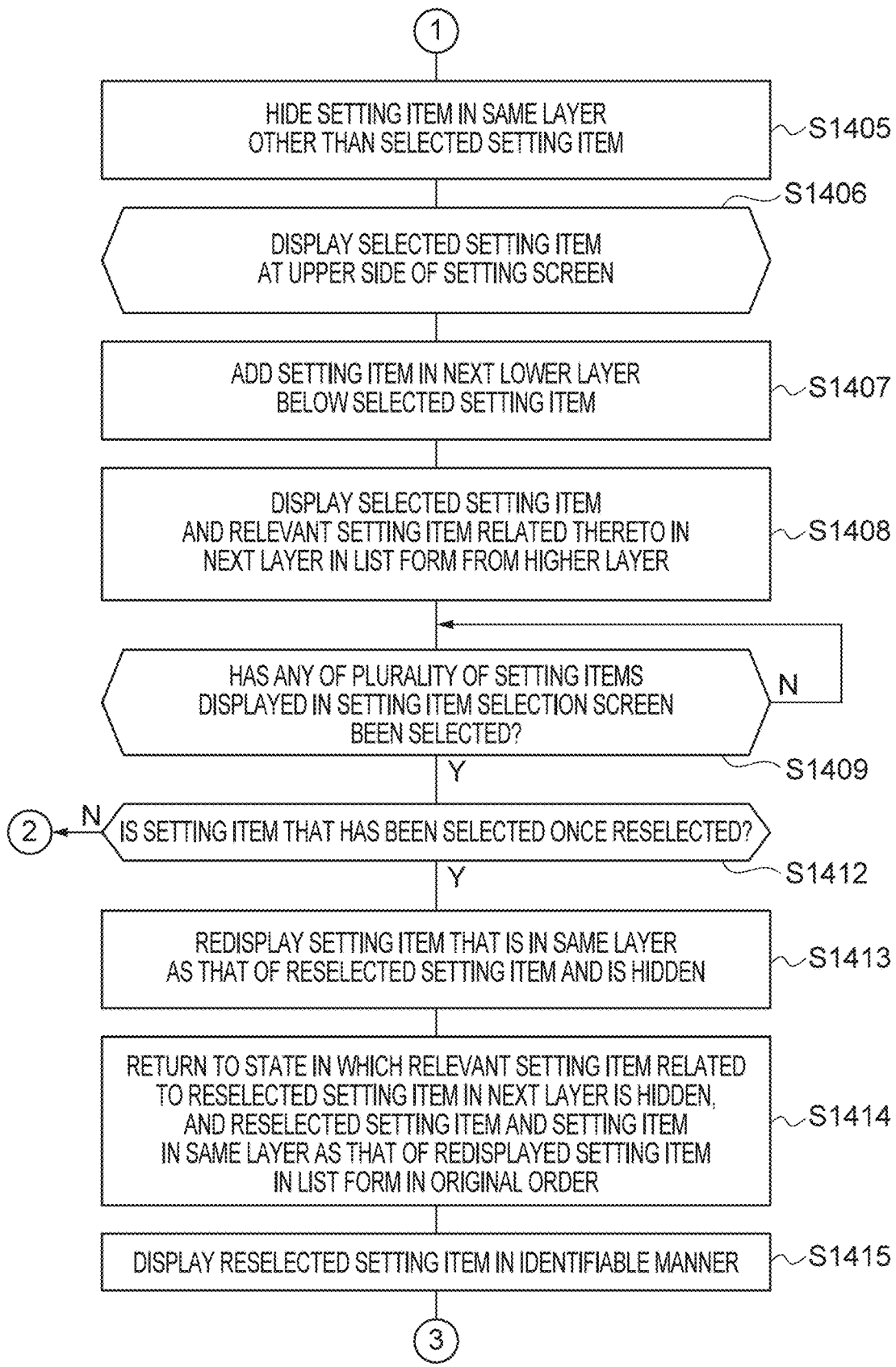
FIG. 16 is a flowchart illustrating a flow of relevant setting item display control processing executed by the display control device.

In a case where it is determined that there is a relevant setting item in the next lower layer than that of the selected setting item (YES in Step S1403), the CPU 111 executes relevant setting item display control processing as illustrated in FIG. 16. The relevant setting item display control processing will be described later.

In a case where it is determined that there is no relevant setting item in the next lower layer than that of the selected setting item (NO in Step S1403), the CPU 111 receives a setting instruction for the selected setting item in the lowest layer (Step S1404). As a result, the CPU 111 ends a series of processings related to the setting item display control processing.

FIG. 16 is a flowchart illustrating a flow of the relevant setting item display control processing executed by the CPU 111 of the control device 110.

In a case where it is determined that there is a relevant setting item in the next lower layer than that of the selected setting item (YES in Step S1403 illustrated in FIG. 15), the CPU 111 hides setting items in the same layer other than the selected setting item as illustrated in FIG. 16 (Step S1405). For example, as illustrated in FIG. 10, in a case where the N-up function, which is the selected setting item in the first layer, is selected, the setting items in the first layer other than the setting item for the N-up function are hidden. That is, "select scale", "select paper", "color mode", and "select double-sided/single-sided", which are the setting items in the same layer other than the setting item for the N-up function, are hidden.

The CPU 111 displays the selected setting item on the upper side of the setting item selection screen (Step S1406). For example, as illustrated in FIG. 10, in a case where the setting item for the N-up function is selected, the setting item for the N-up function (the setting item corresponding to the N-up setting button 65), which is the selected setting item in the first layer, is displayed on the upper side of the first-layer setting item display region 6 of the setting item selection screen 300A1. Accordingly, in this example, the N-up setting button 65 corresponding to the selected setting item in the first layer is displayed immediately below "copy" selected as the main function.

The CPU 111 adds setting items in the next lower layer below the selected setting item (Step S1407). For example, as illustrated in FIG. 10, in a case where the setting item for the N-up function is selected, the setting items, "none" (that is, the non-N-up setting button 71), "2-up" (that is, the 2-up setting button 72), "4-up" (that is, the 4-up setting button 73), and "8-up" (that is, the 8-up setting button 74), which are the setting items in the next lower layer, are added below the N-up setting button 65.

The CPU 111 sequentially displays the selected setting item and the relevant setting items related thereto in the next layer in a list form from the higher layer (Step S1408). For example, as illustrated in FIG. 10, the CPU 111 sequentially displays, in a list form from the higher layer, the N-up setting button 65 corresponding to the selected setting item for the N-up function, the non-N-up setting button 71 corresponding to the setting item "none", the 2-up setting button 72 corresponding to the setting item "2-up", the 4-up setting button 73 corresponding to the setting item "4-up", and the 8-up setting button 74 corresponding to the setting item "8-up".

The CPU 111 determines whether or not any of a plurality of setting items displayed in the setting item selection screen 300 has been selected (Step S1409). For example, the CPU 111 determines whether or not any of the setting items respectively corresponding to the non-N-up setting button 71, the 2-up setting button 72, the 4-up setting button 73, and the 8-up setting button 74 has been selected in the setting item selection screen 300A1 illustrated in FIG. 10.

In a case where none of the plurality of setting items displayed in the setting item selection screen 300 is selected (NO in Step S1409), the CPU 111 waits until any of the plurality of setting items displayed in the setting item selection screen 300 is selected.

In a case where any of the plurality of setting items displayed in the setting item selection screen 300 has been selected (YES in Step S1409), the CPU 111 determines whether or not a setting item that has been selected once is reselected (Step S1412).

In a case where a setting item that has been selected once is selected (YES in Step S1412), the CPU 111 redisplays setting items that are in the same layer as that of the reselected setting item and have been temporarily hidden (Step S1413). For example, as illustrated in FIG. 12, due to the N-up setting button 65 being reselected, the scale setting button 61 corresponding to "select scale", the paper setting button 62 corresponding to "select paper", the color mode setting button 63 corresponding to "color mode", and the double-sided/single-sided setting button 64 corresponding to "select double-sided/single-sided", which are the hidden first-layer setting items, and the N-up setting button 65 corresponding to the N-up function, are redisplayed.

In a case where a setting item that has been selected once is not reselected (NO in Step S1412), the CPU 111 proceeds to the processing of Step S1403 illustrated in FIG. 15.

After the processing of Step S1413, the CPU 111 hides the relevant setting items related to the reselected setting item in the next layer, and returns to a state in which the reselected setting item and setting items in the same layer as that of the redisplayed setting item are displayed in a list form in the original order (Step S1414). For example, the non-N-up setting button 71 corresponding to "none", the 2-up setting button 72 corresponding to "2-up", the 4-up setting button 73 corresponding to "4-up", and the 8-up setting button 74 corresponding to "8-up" related to the reselected N-up function (indicated by the N-up setting button 65 in FIG. 10) in the next layer are hidden as illustrated in FIG. 12. For example, the N-up setting button 65 corresponding to the reselected N-up function, and the scale setting button 61 corresponding to "select scale" which is a setting item in the same layer as that of the reselected N-up function, the paper setting button 62 corresponding to "select paper", the color mode setting button 63 corresponding to "color mode", and the double-sided/single-sided setting button 64 corresponding to "select double-sided/single-sided" are displayed in a list form in the original order.

The CPU 111 performs the reselected setting item in an identifiable manner in order to distinguish the reselected setting item from other setting items (Step S1415). For example, the N-up setting button 65 corresponding to the reselected N-up function is highlighted to be distinguished from other setting items as illustrated in FIG. 12.

The CPU 111 proceeds to the processing of Step S1402 illustrated in FIG. 15.

As described above, in the multi-function peripheral 100, setting items that have not been selected from a plurality of setting items displayed in a list form as setting items in the same layer are temporarily hidden. The selected setting item is displayed on the upper side of a display region in which the plurality of setting items were displayed in a list form, and a relevant setting item related to the selected setting item is additionally displayed below the selected setting item. Therefore, in the multi-function peripheral 100, it is possible to secure a wide region for displaying the relevant setting item associated with the selected setting item in the setting item selection screen 300 which is an example of an operation screen having a limited display region. In the multi-function peripheral 100, only an operation system for the selected setting item is displayed by hiding setting items that have not been selected. Therefore, it is possible to easily understand an item that is currently being set by an operator. As a result, in the multi-function peripheral 100, it is possible to set various functions by using an operation screen excellent in visibility and operability by efficiently displaying items for setting the functions in the operation screen.

In the multi-function peripheral 100, in a case where the selected setting item is reselected in a state in which setting items other than the selected setting item are hidden, the hidden setting items are redisplayed. Therefore, in the multi-function peripheral 100, a setting item in the same layer as that of the selected setting item can be confirmed if necessary, or another setting item that has been redisplayed can be selected.

In the multi-function peripheral 100, in a case where the selected setting item is reselected in a state in which setting items other than the selected setting item are hidden, the hidden setting items are displayed, and the selected setting item that has been reselected is highlighted to be distinguished. Therefore, in the multi-function peripheral 100, it is possible to identify a selected setting item that has been reselected.

Here, the slide button illustrated in FIG. 8 and the normal button illustrated in FIG. 9 will be described as the start button 11 of the multi-function peripheral 100. The start button 11 can be switched to a slide button or a normal button according to a setting registered in the multi-function peripheral 100 in advance. The slide button is a button on which an operator performs a sliding operation to execute a desired job, and is mainly used as a button for executing a job requiring careful execution, a button in the case of displaying on a relatively large operation screen (that is, an operation screen of a personal computer monitor, a tablet terminal, or the like), or a button in the case of displaying on a touch-panel-type operation screen for preventing erroneous operation.

The normal button is a button on which an operator performs a click operation or a tapping operation to execute a desired job, and is mainly used as a button for executing a job that does not require careful execution or a button in the case of displaying on a relatively small operation screen (that is, an operation screen of a smartphone or the like).

Examples of the job requiring careful execution include the copy function, the printing function, and the facsimile function. For example, the copy function and the printing function requires caution because there is a printing cost related to use of paper sheets. The facsimile function requires caution because data is transmitted to the outside, and an error of data or leakage of information to the outside needs to be prevented. Examples of the job that does not require much caution when executed include the scanning function.

Switching of the display form of the start button 11 can be customized by an operator registering the display form in advance in the multi-function peripheral 100 if necessary. For example, in a case where the copy function, the printing function, or the facsimile function is selected, the start button 11 may be set to be displayed as the slide button. In a case where the scanning function is selected, the start button 11 may be set to be displayed as the normal button. The setting may be performed according to the number-of-copies-to-be-printed setting and print color setting in a case where the copy function or the printing function is selected, instead of the setting in the main function unit. For example, the slide button may be used in a case where the number of copies to be printed is 50 or more, and the normal button may be used in a case where the number of copies to be printed is 50 or less, or the slide button may be used in a case where the print color setting is full color, and the normal button may be used in a case where the print color setting is black-and-white. It is also possible to perform setting such that switching is made according to individual conditions. For example, the slide button may be used in the case of facsimile transmission to the outside of the company or scanning for storage, and the normal button may be used in the case of facsimile transmission to the inside of the company, or scanning for storage.

Second Embodiment

Next, a control unit used in a multi-function peripheral according to a second embodiment will be described. In the second embodiment, the same components, members, and the like as those of the first embodiment are denoted by the same reference signs, a detailed description thereof is omitted, and differences will be mainly described.

FIGS. 17 to 20 are views illustrating a setting item selection screen 2300 used in a multi-function peripheral 100 according to the second embodiment. An example in which "copy" is selected as a main function in the setting item selection screen 2300 of the multi-function peripheral 100 according to the second embodiment as in the first embodiment will be described.

For example, in the setting item selection screen 300 of the multi-function peripheral 100 according to the first embodiment, the "copy" function is indicated by both the main function display line 3 and the selected item display region 4 as illustrated in FIG. 10. In the setting item selection screen 300, a selected setting item in the first layer is displayed on the upper side of the first-layer setting item display region 6 below the main function display line 3. With this display state, a region where relevant setting items can be displayed is reduced in size by the size of a region (the N-up setting button 65) for displaying the selected setting item in the first layer. Therefore, in a case where the number of relevant setting items is large, there is a possibility that not all the relevant setting items are displayed in the setting item selection screen 300.

In the multi-function peripheral 100 according to the second embodiment described below, items for setting functions are displayed more efficiently, so that a wider display region for relevant setting items can be secured.

Figure 17:
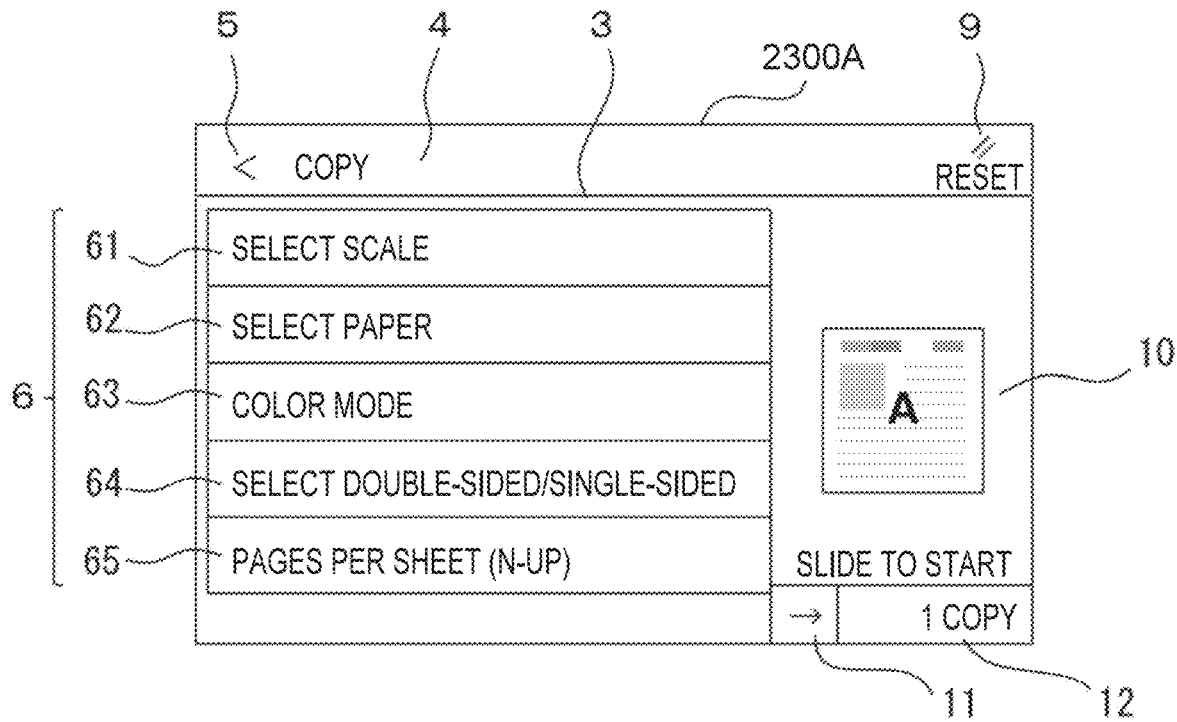
FIG. 17 is a view illustrating an initial screen in a case where a copy function is selected in an operation screen of a multi-function peripheral according to a second embodiment.

FIG. 17 is a view illustrating a setting item selection screen 2300A as an example of an initial screen in a case where the copy function is selected, the initial screen being displayed on a display unit 121 of the multi-function peripheral 100 according to the second embodiment. As illustrated in FIG. 17, the initial screen in a case where the copy function is selected has the same configuration as the initial screen of the multi-function peripheral 100 according to the first embodiment in a case where the copy function is selected. A main function display line 3 colored in yellow indicates that the currently selected main function of the multi-function peripheral 100 is the copy function, on the upper side of the setting item selection screen 2300A. At the same time, characters "copy" indicating the currently selected main function are displayed in a selected item display region 4 above the main function display line 3. A first-layer setting item display region 6 in which a plurality of setting items associated with the copy function are displayed in a list form is provided below the main function display line 3. Setting items, "select scale" (that is, a scale setting button 61), "select paper" (that is, a paper setting button 62), "color mode" (that is, a color mode setting button 63), "select double-sided/single-sided" (that is, a double-sided/single-sided setting button 64), and "pages per sheet (N-up)" (that is, an N-up setting button 65), are displayed in the first-layer setting item display region 6.

Figure 18:
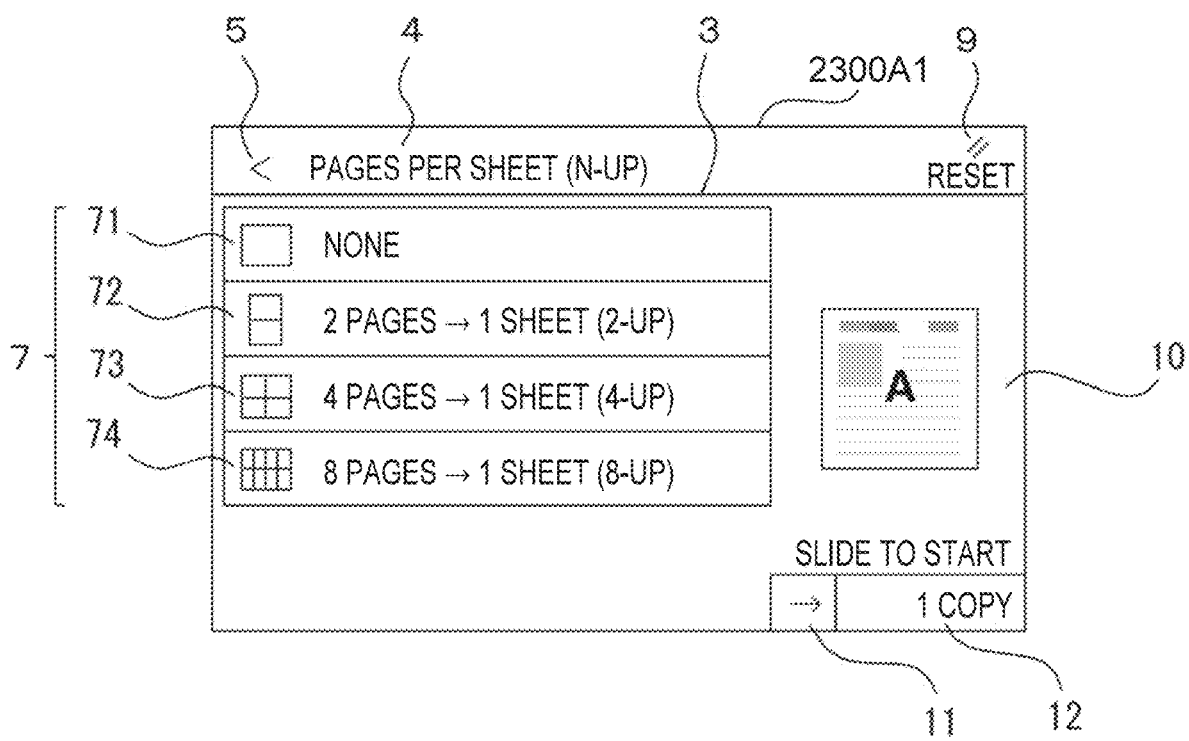
FIG. 18 is a view illustrating the operation screen in a case where a first-layer setting item in the operation screen of the multi-function peripheral according to the second embodiment is selected (for example, in a case where an up setting button is selected).

FIG. 18 is a view illustrating a setting item selection screen 2300A1 (for example, a screen in a case where a first-layer setting item is selected) in a case where "pages per sheet (N-up)" (that is, the N-up setting button 65) is selected by a tapping operation in the setting item selection screen 2300A in a case where the copy function of the multi-function peripheral 100 is selected as illustrated in FIG. 17. As illustrated in FIG. 18, in a case where "pages per sheet (N-up)" (that is, the N-up setting button 65) is selected from the five setting items displayed in the setting item selection screen 2300A in a case where the copy function is selected, "pages per sheet (N-up)", which is the selected setting item in the first layer, is displayed in the selected item display region 4, and all the setting items displayed in the first-layer setting item display region 6 are hidden. Then, a second-layer setting item display region 7 appears below the main function display line 3, instead of the first-layer setting item display region 6. In the second-layer setting item display region 7, relevant setting items, "none" (that is, a non-N-up setting button 71), "2-up" (that is, a 2-up setting button 72), "4-up" (that is, a 4-up setting button 73), and "8-up" (that is, an 8-up setting button 74) which are second-layer setting items associated with "pages per sheet (N-up)" which is the selected setting item in the first layer, are displayed in a list form. In the setting item selection screen 2300A1 illustrated in FIG. 18, once a return button 5 is tapped, the screen returns to a screen before "pages per sheet (N-up)" is selected (the setting item selection screen 2300A illustrated in FIG. 17).

Figure 19:
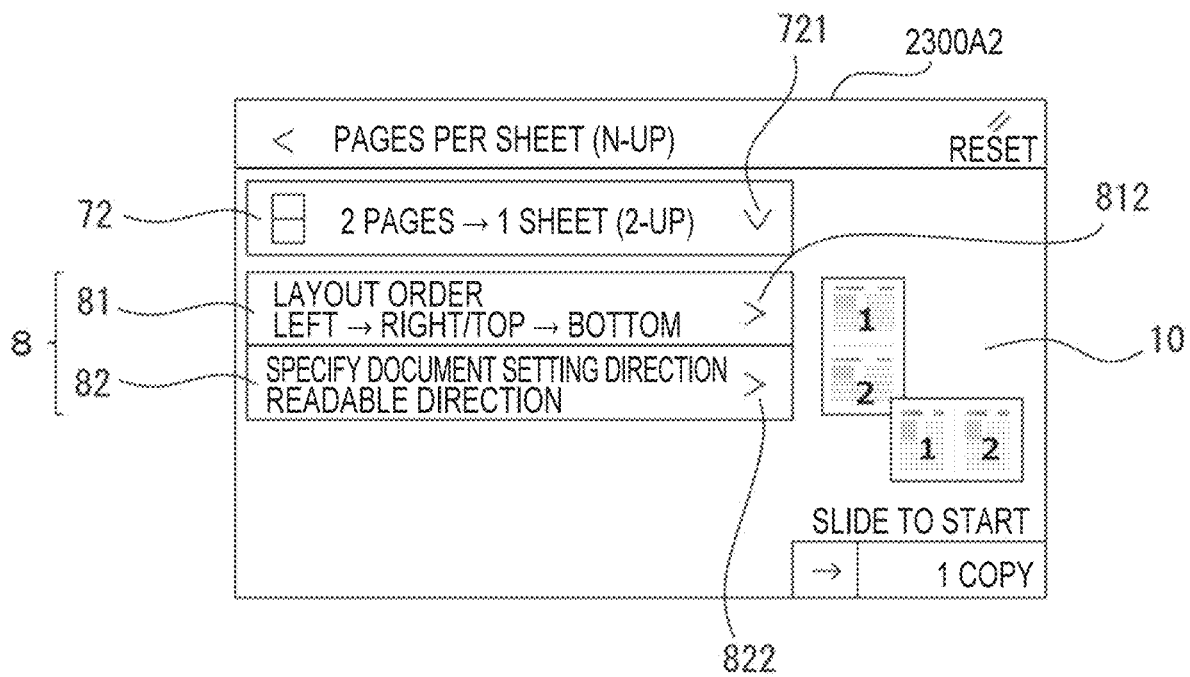
FIG. 19 is a view illustrating the operation screen in a case where a second-layer setting item in the operation screen of the multi-function peripheral according to the second embodiment is selected (for example, in a case where a 2-up setting button is selected).

FIG. 19 is a view illustrating a setting item selection screen 2300A2 (for example, a screen in a case where a second-layer setting item is selected) in a case where "2-up" (that is, the 2-up setting button 72) is selected by a tapping operation in the setting item selection screen 2300A1 in a case where a first-layer setting item is selected as illustrated in FIG. 18. As illustrated in FIG. 19, setting items in the second layer other than "2-up" which is the selected setting item in the second layer are hidden in the setting item selection screen 2300A2 in a case where a second-layer setting item is selected. "2-up" (that is, the 2-up setting button 72), which is the selected setting item in the second layer, is displayed on the upper side of the second-layer setting item display region 7, that is, at a display position of a setting item in the uppermost row of the second-layer setting items displayed in a list form. A non-display setting item indicator 721 for indicating that there is a setting item (for example, the 4-up setting button 73, the 8-up setting button 74, or the like) that is hidden and is in the same layer as that of "2-up" is displayed at the right end of "2-up" (2-up setting button 72) displayed in the setting item selection screen 2300A2 in a case where a second-layer setting item is selected.

A third-layer setting item display region 8 additionally appears below the 2-up setting button 72. In the third-layer setting item display region 8, the setting items "layout order" (that is, a layout order setting button 81) and "document setting direction" (that is, a document setting direction setting button 82) are displayed in a list form as relevant setting items associated with "2-up" which is a selected setting item in the second layer. Indicators 812 and 822 for indicating that transition to a screen for setting each item can be made are displayed at the right ends of the layout order setting button 81 and the document setting direction setting button 82, respectively. An operator can select any of setting items displayed in the third-layer setting item display region 8 by a tapping operation, thereby selecting a desired setting item from the setting items displayed in the third-layer setting item display region 8 and changing the setting in each setting item selection screen (not illustrated) if necessary.

An operation system for the setting item for the N-up function can be viewed also in the setting item selection screen 2300A2 illustrated in FIG. 19. That is, by viewing the setting item selection screen 2300A2, an operator can immediately understand that the current operation status is as follows: "copy" is selected as the main function (referring to the main function display line 3), "2-up" is selected in the "pages per sheet (N-up)" function, "layout order" in "2-up" is set to "left→right/top→bottom", and "document setting direction" is set to "readable direction". Since "pages per sheet (N-up)", which is the selected setting item in the first layer, is displayed in the selected item display region 4, it is possible to secure a wider region for displaying third-layer setting items associated with the selected setting item "2-up" in the second layer than that in the multi-function peripheral 100 according to the first embodiment.

Figure 20:
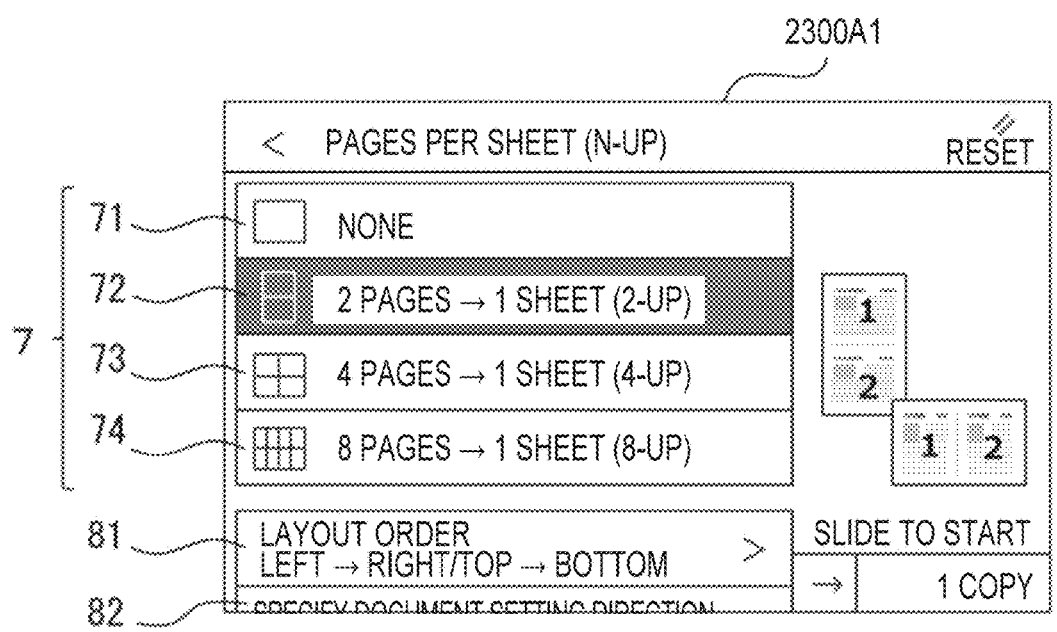
FIG. 20 is a view illustrating a state in which a second-layer setting item in the operation screen of the multi-function peripheral according to the second embodiment is displayed again.
Figure 21:
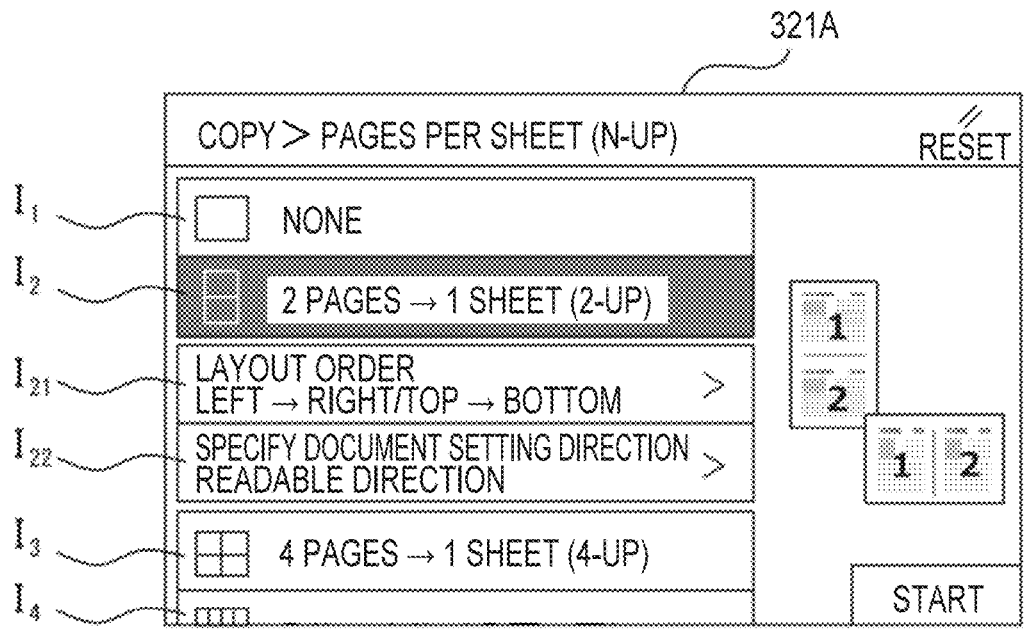
FIG. 21 is a view illustrating an example of an operation screen according to a comparative example.
Figure 22:
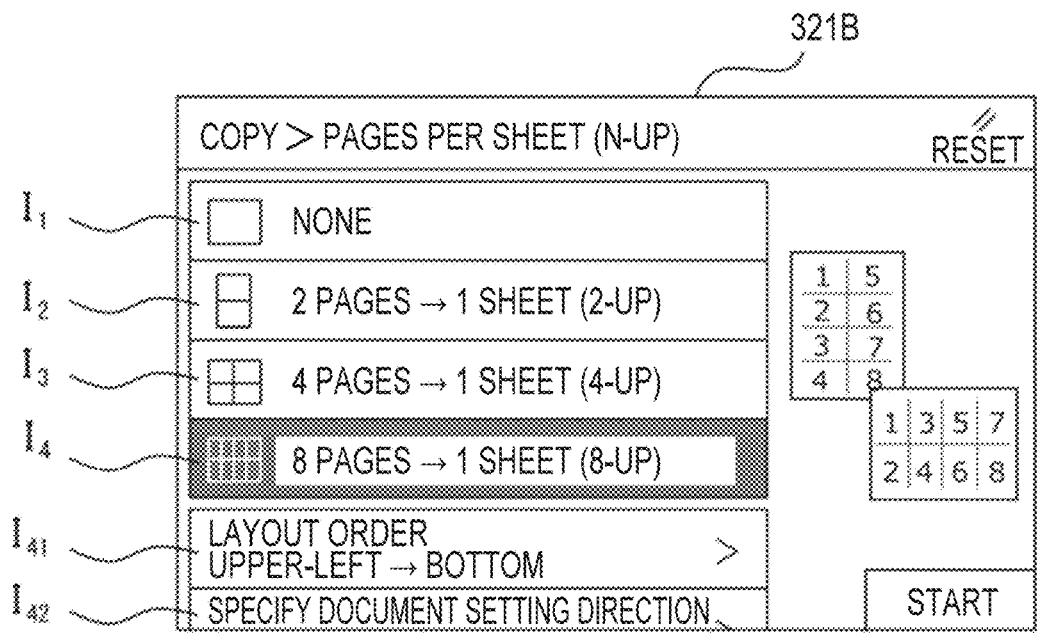
FIG. 22 is a view illustrating another example of the operation screen according to the comparative example.

FIG. 20 is a view illustrating a display state of the setting item selection screen 2300A1 in a case where "2-up" (that is, the 2-up setting button 72), which is the selected setting item in the second layer, is reselected by a tapping operation in the setting item selection screen 2300A2 in a case where a second-layer setting item is selected as illustrated in FIG. 19. As illustrated in FIG. 20, the 2-up setting button 72 is reselected, thereby reproducing the second-layer setting item display region 7. The hidden second-layer setting items "none" (that is, the non-N-up setting button 71), "4-up" (that is, the 4-up setting button 73), "8-up" (that is, the 8-up setting button 74), and "2-up" (that is, 2-up setting button 72) are displayed in a list form again in the order in which they were originally displayed. At this time, "2-up" (that is, the 2-up setting button 72) is highlighted in order to display the currently selected setting item in a recognizable manner.

Once a desired setting item is selected from the redisplayed setting items in the second layer in the setting item selection screen 2300A1 illustrated in FIG. 20, setting items other than the selected setting item in the second layer are hidden as illustrated in FIG. 19. At the same time, the selected setting item in the second layer is displayed on the upper side of the second-layer setting item display region 7, the third-layer setting item display region 8 appears below the selected setting item, and setting items associated with the selected setting item are displayed in a list form as the setting items in the third layer.

Next, a flow of display control processing executed by a control device 110 used in the multi-function peripheral 100 according to the second embodiment will be described. The flow of the display control processing executed by the control device 110 of the multi-function peripheral 100 according to the second embodiment is basically similar to the flow of the display control processing executed by the control device 110 of the multi-function peripheral 100 according to the first embodiment, but the setting processing (Step S1400) in the flowchart illustrated in FIG. 14 is different. In the control device 110 of the multi-function peripheral 100 according to the second embodiment, in the setting processing, a CPU 111 hides the selected main function and further displays an identification portion for identification of the selected main function on the upper side of a display region in which a plurality of setting items were displayed in a list form. For example, as illustrated in FIG. 18, in a case where "pages per sheet (N-up)" (that is, the N-up setting button 65) is selected from the five setting items displayed in the setting item selection screen 2300A in a case where the copy function is selected, "pages per sheet (N-up)", which is the selected setting item in the first layer, is displayed in the selected item display region 4, and all the setting items displayed in the first-layer setting item display region 6 are hidden. That is, "copy" which is the main function is hidden. Further, the main function display line 3 colored in yellow is displayed below the selected item display region 4 as an identification portion indicating that the main function of the multi-function peripheral 100 is the copy function.

As described above, in the multi-function peripheral 100 according to the second embodiment, the CPU 111 temporarily hides setting items that have not been selected among a plurality of setting items displayed in a list form as first-layer setting items, and displays the selected setting item in the selected item display region 4 provided on the upper side of the setting item selection screen 2300A. At the same time, the CPU 111 temporarily hides setting items that have not been selected among a plurality of setting items displayed in a list form as second-layer setting items, and displays the selected setting item on the upper side of the second-layer setting item display region 7. As a result, in the multi-function peripheral 100 according to the second embodiment, it is possible to secure a wider region for displaying relevant setting items in the setting item selection screen 2300A having a limited display region. Only an operation system for the selected setting item is displayed, and it is possible to easily understand what kind of item an operator is currently setting.

In the multi-function peripheral 100 according to the second embodiment, in a case where a setting item corresponding to a main function is selected from a plurality of setting items in which the main functions, which correspond to the highest layer, are displayed in a list form, the CPU 111 hides the selected setting item. The CPU 111 displays the main function display line 3 as an identification portion for identification of the selected setting item on the upper side of a display region in which the plurality of setting items were displayed in a list form. As a result, in the multi-function peripheral 100 according to the second embodiment, it is possible to secure a wider region for displaying relevant setting items in the setting item selection screen 2300A having a limited display region.

In the multi-function peripheral 100 according to the second embodiment, in a case where the selected setting item is reselected in a state in which setting items other than the selected setting item are hidden, the CPU 111 redisplays the hidden setting items. Therefore, a setting item in the same layer as that of the selected setting item can be confirmed if necessary, or another setting item that has been redisplayed can be selected.

Hereinabove, an embodiment of the information apparatus according to the disclosure has been described with the display control in the case of a setting operation for the "N-up" function in the copy function of the multi-function peripheral as an example, but the technology of the disclosure is not limited thereto. The technology of the disclosure can also be applied to display control in the case of a setting operation for various functions in other functions (for example, the printing function, the facsimile function, and the scanning function) of the multi-function peripheral, and an information apparatus such as a smartphone or a mobile phone in which items for setting functions of the apparatus are displayed in a hierarchical manner in an operation screen and are sequentially operated, thereby enabling setting of various functions.

In the multi-function peripherals 100 according to the first and second embodiments, in a case where the selected setting item is reselected in a state in which setting items other than the selected setting item are hidden, the hidden setting items are displayed, and the selected setting item that is reselected is highlighted. However, the technology of the disclosure is not limited thereto. For example, when the hidden setting items are displayed, another display state may be used as long as the selected setting item that is reselected can be distinguished from the setting items. As the other display state, for example, a method of coloring the selected setting item that is reselected or giving a mark such as a line to the selected setting item may be used.

The multi-function peripherals 100 according to the first and second embodiments have the copy function, the scanning function, the facsimile function, and the printing function, but the technology of the disclosure is not limited thereto. For example, an information apparatus having two or more of the copy function, the scanning function, the facsimile function, and the printing function may be used. The information apparatus according to the disclosure may have other main functions (for example, telephone communication) other than the copy function, the scanning function, the facsimile function, and the printing function.

A hardware structure of a processing unit that executes various processing in the display control device according to the disclosure is implemented by the following various processors and memories connected to or built in the processors. The various processors include a programmable logic device (PLD) such as a field programmable gate array (FPGA), a dedicated circuitry such as an application specific integrated circuit (ASIC), and the like in addition to a CPU which is a general-purpose processor that executes software and functions as various processing units.

One processing unit may be implemented by one of these various processors, or may be implemented by a combination of two or more processors of the same type or different types (for example, a combination of a plurality of FPGAs or a combination of a CPU and an FPGA). A plurality of processing units may be implemented by one processor.

In a case where a plurality of processing units are implemented by one processor, for example, one processor may be implemented by a combination of one or more CPUs and software, and this processor may function as a plurality of processing units, as represented by a computer such as a client and a server. Alternatively, a processor that implements a function of the entire system including a plurality of processing units with one integrated circuit (IC) chip, as represented by a system on chip (SoC) or the like, may be used. As described above, the various processing units are implemented using one or more of the various processors as a hardware structure.

More specifically, a circuitry obtained by combining circuit elements such as semiconductor elements can be used as the hardware structure of these various processors.

The disclosure of Japanese Patent Application No. 2019-236892 filed on Dec. 26, 2019 is incorporated herein by reference in its entirety. All documents, patent applications, and technical standards mentioned herein are incorporated herein by reference to the same extent as if each individual document, patent application, and technical standard were specifically and individually stated.

INDUSTRIAL APPLICABILITY

The disclosure relates to a display control device that, in a case where an arbitrary setting item is selected from a plurality of setting items displayed in a list form in an operation screen, additionally displays a relevant setting item related to the selected setting item, and has industrial applicability.

What is claimed is:

1. A display control device that comprises a processor and a memory coupled to or integrated with the processor and that controls display of an operation screen of an information apparatus,
    wherein, in a case in which setting items for a main function are displayed in a list form on the operation screen and one first layer setting item is selected from the displayed setting items, the processor is configured to not display first layer setting items other than the selected first layer setting item, display the selected first layer setting item at a top of a display region in which the plurality of first layer setting items were displayed in a list form or at a top of an area where the main function was displayed at the top of the operation screen, and additionally display a list of second layer setting items related to the selected first layer setting item directly below the selected first layer setting item with setting items other than the selected first layer setting item being not displayed, and
    wherein, in a case in which a second layer setting item is arbitrarily selected from the list of second layer setting items, the processor is configured to not display second layer setting items other than the selected second layer setting item, display the selected second layer setting item at a top of a display region in which the list of second layer setting items were displayed and directly below the selected second layer setting item, and additionally display a list of third layer setting items related to the selected second layer setting item directly below the selected second layer setting item, with setting items other than the selected second layer setting item being not displayed.

2. The display control device according to claim 1, wherein, in a case in which the selected setting item is reselected in a state in which the setting items other than the selected setting item are not displayed, the setting items other than the selected setting item are redisplayed.

3. The display control device according to claim 2, wherein, in a case in which setting items other than the selected setting item are redisplayed, the redisplayed setting items and the selected setting item are displayed so as to be distinguishable from each other.

4. The display control device according to claim 1, wherein:
    the setting item and the relevant setting item are configured in a hierarchical manner,
    the selected setting item and the setting items other than the selected setting item are setting items in a same layer, and
    the relevant setting item related to the selected setting item is a setting item in a lower layer than that of the selected setting item.

5. The display control device according to claim 4, wherein:
    the operation screen is an operation screen of an information apparatus comprising, as main functions, at least two of a copy function of copying a document, a scanning function of reading a document, or a facsimile function of transmitting an image obtained by reading a document as image data, and
    the plurality of setting items are setting items for setting processing conditions of the main functions.

6. An information apparatus comprising the display control device according to claim 1.

7. The display control device according to claim 1, wherein the selected setting item selected on the second layer is displayed at the top of the display region where the setting items on the second layer were displayed on the list.

8. A non-transitory recording medium storing a display control program executable by a processor to perform processing comprising:
    in a case in which setting items for a main function are displayed in a list form on an operation screen and one first layer setting item is selected from the displayed setting items, not displaying first layer setting items other than the selected first layer setting item,
    displaying the selected first layer setting item at an upper side of a display region in which the plurality of first layer setting items were displayed in a list form or in an area where the main function was displayed at the top of the operation screen,
    additionally displaying a list of second layer setting items related to the selected first layer setting item below the selected first layer setting item with setting items other than the selected first layer setting item not being displayed, and
    in a case in which a second layer setting item is arbitrarily selected from the list of second layer setting items, not displaying second layer setting items other than the selected second layer setting item, displaying the selected second layer setting item at an upper side of a display region in which the list of second layer setting items were displayed, and additionally displaying a list of third layer setting items related to the selected second layer setting item below the selected second layer setting item, with setting items other than the selected second layer setting item not being displayed.

9. The non-transitory recording medium according to claim 8, wherein the processing further comprises redisplaying the setting items other than the selected setting item in a case in which the selected setting item is reselected in a state in which the setting items other than the selected setting item are not displayed.

* * * * *